US006409328B1

(12) United States Patent
Ohkawa

(10) Patent No.: US 6,409,328 B1
(45) Date of Patent: Jun. 25, 2002

(54) METHOD OF FORMING IMAGES AND MATERIAL FOR IMAGE FORMATION

(75) Inventor: Atsuhiro Ohkawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/541,004

(22) Filed: Mar. 31, 2000

(30) Foreign Application Priority Data

Mar. 31, 1999 (JP) .......................................... 11-093088

(51) Int. Cl.$^7$ ................................................ G01D 11/00
(52) U.S. Cl. ....................................... 347/100; 347/101
(58) Field of Search ................................ 347/100, 105, 347/101; 427/152

(56) References Cited

U.S. PATENT DOCUMENTS 5,667,943 A * 9/1997 Boggs et al. ............... 430/343
5,753,587 A * 5/1998 Podszun et al. ............ 427/152

FOREIGN PATENT DOCUMENTS

| | | |
|---|---|---|
| EP | 0 909 656 A2 | 4/1999 |
| JP | A-11-70736 | 3/1999 |

* cited by examiner

*Primary Examiner*—John Barlow
*Assistant Examiner*—Manish Shah
(74) *Attorney, Agent, or Firm*—Sughrue Mion, PLLC

(57) ABSTRACT

Disclosed are an image forming method including forming images in an image-forming material by means of a thermal printer head, wherein the image-forming material including a compound capable of releasing a strong acid under the action of heat and a compound capable of forming a dye by the reaction with an acid, and an image-forming material suitable for printing with a thermal head.

6 Claims, No Drawings

METHOD OF FORMING IMAGES AND MATERIAL FOR IMAGE FORMATION

FIELD OF THE INVENTION

The present invention relates to an image-forming material suitable for the image formation using a thermal printer head and a method of forming images by the use of such a material. Specifically, the invention is concerned with a method of image formation based on the thermal reaction between a thermoacid generator and a material of forming a dye by the reaction with an acid (or a color former). More specifically, the invention relates to a material enabling the image formation utilizing an acid and/or dye multiplication system and having high sensitivity and good keeping quality, and further to a method for image formation using such a material.

BACKGROUND OF THE INVENTION

The thermal recording is a method of forming images with gradation depending on the magnitude of thermal energy applied. As to the mechanism employed therein for image formation, various ways have been devised, wherein the thermal energy applied causes fusion or sublimation transfer of colorants, a coloring reaction between two components via thermal fusion or capsule rupture, a change in optical characteristics by phase transition, and so on. As the thermal recording materials of the foregoing kind have advantages of providing recorded images on a dry and simple processing system and requiring practically no maintenance, they are widely used as output materials of various kinds of recording apparatus, such as a printer, a word processor and facsimile. The methods adopted for application of thermal energy are broadly classified into two groups, a laser-using group and a thermal printer head-using group. The former group of methods can provide high-definition images, but on the other hand, they require a considerable cost of hardware and a large-scale apparatus. In contrast, the latter group of methods which use a thermal printer head clear up the foregoing problems. As to the image quality, the demand covers a wide range, from high to low image quality. In cases where high image quality is not particularly required, therefore, the thermal printer head-using methods are useful because of their merits mentioned above.

With respect to the recording materials in which images can be recorded with a thermal printer head, the graphic arts materials of the kind which form images by causing a reaction between an organic silver salt and a reducing agent when heat is applied thereto are disclosed, e.g., in JP-A-8-58239 and JP-A-8-276664 (the term "JP-A" as used herein means an "unexamined published Japanese patent application"). However, the silver salts contained therein have some sensitivity to light, so that one problem of those materials is that special care is required not only upon storage in daylight but also for avoiding light at the time they are used, and another problem thereof is how the recovery of silver source and the disposal of waste materials are carried forward.

The recording materials which utilize silver salt-free (nonsilver) heat-sensitive recording method to settle the aforementioned problems are described in JP-A-11-70735, JP-A-11-70736, JP-A-11-70742 and JP-A-11-70733. Therein is employed the way of isolating leuco dyes from a color developer by heat-responsive capsules and causing color development by thermal penetration. However, those materials have a drawback of being unsatisfactory in developed color densities. Under those circumstances, no recording materials satisfactory in both color developability and processability have been found yet, and so the development of a recording material having both the abilities has been desired.

Further, the problem common to the recording methods using a thermal printer head is that the thermal printer head is smeared and causes sticking, so that it is necessary to improve such conditions.

SUMMARY OF THE INVENTION

Therefore, a first object of the present invention is to provide a highly heat-sensitive material suitable for recording with a thermal printer head and a method of recording images in such a material by means of a thermal printer head.

A second object of the present invention is to provide a heat-sensitive recording material which can be handled and kept safely in daylight and can develop colors of high densities.

A third object of the present invention is to provide a recording material which does not require troublesome treatments for disposal of the used recording material, including the recovery of silver.

A fourth object of the present invention is to provide a recording material which is improved in the extent to which a thermal printer head is smeared and causes sticking.

The foregoing objects of the present invention are attained according to the embodiments (1) to (10) as described below:

(1) An image forming method comprising forming images in an image-forming material by means of a thermal printer head, wherein the image-forming material comprises a compound capable of releasing a strong acid under the action of heat and a compound capable of forming a dye by the reaction with an acid.

(2) The image forming method as described in Embodiment (1), wherein the image-forming material is free of silver.

(3) The image forming method as described in Embodiment (1) or (2) , wherein the compound capable of releasing a strong acid is a compound represented by the following formula (I):

$$W^1OP^1 \qquad (I)$$

wherein $W^1$ represents a moiety to constitute the acid of formula $W^1OH$, and $P^1$ represents a substituent group eliminable by the action of heat or an acid.

(4) The image forming method as described in Embodiment (3) wherein the compound of formula (I) is a compound represented by the following formula (II), (III) or (IV):

(II)

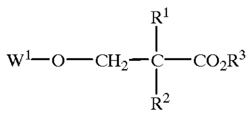

wherein $R^1$ represents an electron-attracting group having a Hammett's $\sigma_P$ value greater than 0, $R^2$ represents an alkyl group, $R^3$ represents a group eliminable by the action of heat or an acid, and $W^1$ has the same meaning as in formula (II);

(III)

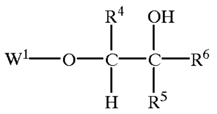

wherein $R^4$, $R^5$ and $R^6$ each represent a hydrogen atom, an alkyl group or an aryl group, and $W^1$ has the same meaning as in formula (I); and $$P^2—X—L—C(R^7)(R^8)—OW^1 \quad (IV)$$

wherein $P^2$ represents a substituent group eliminable by the action of heat or an acid, X represents O, S, $NR^9$ or $CR^{10}R^{11}$ wherein $R^9$ is a hydrogen atom or a group substitutable for hydrogen atom and $R^{10}$ and $R^{11}$, which may be the same or different, each represents a hydrogen atom or a group substitutable for hydrogen atom, L represents a linkage group, $R^7$ and $R^8$, which may be the same or different, each represents a hydrogen atom or a group substitutable for hydrogen atom, and $W^1$ has the same meaning as in formula (I).

(5) The image forming method as described in any one of Embodiments (1) to (4), wherein the compound capable of forming a dye by the reaction with an acid is a compound capable of undergoing a change in the absorption region of 360 to 900 nm when an acid acts thereon.

(6) The image forming method as described in any one of Embodiments (1) to (5), wherein the compound capable of releasing a strong acid under the action of heat and/or the compound capable of forming a dye by the reaction with an acid is a polymer comprising both a partial structure capable of functioning as an acid generator under heating or in the presence of an acid and a partial structure capable of undergoing a change in the absorption region of 360 to 900 nm when an acid acts thereon.

(7) The image forming method as described in Embodiment (6), wherein the polymer is a polymer represented by the following formula (V):

$$—(A)_x—(B)_y—(C)_z— \quad (V)$$

wherein A represents a constitutional unit repeated in the polymerization of at least one vinyl monomer functioning as an acid generator by the action of heat or an acid; B represents a constitutional unit repeated in the polymerization of at least one vinyl monomer having a partial structure undergoing a change in the absorption region of 360–900 nm when an acid acts thereon; C represents a constitutional unit repeated in the polymerization of at least one vinyl monomer capable of copolymerizing with the vinyl monomers from which A and B are derived; and x, y and z represent proportions of constitutional units A, B and C respectively, and these proportions are expressed in weight % and have the following relations, $1 \leqq x \leqq 100$, $0 \leqq y \leqq 99$, $0 \leqq z \leqq 99$ and $x+y+z=100$.

(8) The image forming method as described in any one of Embodiments (1) to (7), wherein the image-forming material has on a support an image-forming layer and a protective layer.

(9) The image forming method as described in Embodiment (8), wherein the protective layer comprises a binder and a pigment or wax.

(10) The image forming method as described in Embodiment (8), wherein the protective layer is formed of a radiation-curable composition.

(11) An image-forming material used in an image forming method as described in any one of Embodiments (1) to (10).

DETAILED DESCRIPTION OF THE INVENTION

The invention is illustrated below in detail.

In accordance with embodiments of the invention, images are formed by the reaction between a compound generating a strong acid by heat and a compound forming a dye by reacting with an acid.

Examples of a compound generating a strong acid by heat include the compounds recited in a book entitled "Organic Materials for Imaging", compiled by The Society for study of Organic Electronics Materials, published by Bunshin Shuppan in 1997 (many of the compounds recited therein as photoacid generators function as thermoacid generators, too), and known thermoacid generators. The thermoacid generators preferred in the present invention are compounds represented by formula (I).

The compounds represented by formula (I) have a function of generating an acid by the action of heat or an acid.

$W^1$ in the acid generator of formula (I) represents a moiety to constitute an acid of formula WOH (including sulfonic acids, carboxylic acids, phosphoric acids and phenols). It is desirable for $W^1OH$ to be an acid having a pKa value of 3 or below. Suitable examples of such an acid include an arylsulfonic acid, an alkylsulfonic acid, a carboxylic acid having an electron-attracting group, an arylphosphonic acid and an alkylphosphonic acid.

$P^1$ represents a substituent group eliminable by the action of heat or an acid. By the elimination of $P^1$, the acid represented by $W^1OH$ is produced from the acid generator represented by $W^1OP^1$. Examples of such a substituent group include an alkyl group having a hydrogen atom at the β-position (such as tetrahydropyranyl, tetrahydrofuranyl, t-butyl, cyclohexyl, 4,5-dihydro-2-methylfuran-5-yl or 2-cyclohexenyl group), an alkoxycarbonyl group having a hydrogen atom at the β-position (such as t-butoxycarbonyl, cyclohexyloxycarbonyl, 2-(2-methyl)butoxycarbonyl, 2-(2-phenyl)propyloxycarbonyl or 2-chloroethoxycarbonyl group), a silyl group (such as trimethylsilyl, triethylsilyl, t-butyldimethylsilyl or phenyldimethylsilyl group) and substituent groups the elimimation of which are triggered by the decomposition of the group as recited above or an acetal, a ketal, a thioketal, a pinacol or an epoxy ring (such as the groups substituted for the hydrogen atom of $W^1OH$, which are described below in explanation for formulae (II) to (IV)).

Examples of an acid generator represented by formula (I) include α-phenylisopropyl trifluoroacetate, t-butyl trifluoroacetate, cyclohexyl toulenesulfonate, triethylsilyl p-nitrobenzoate, tetrahydropyranyl p-nitrobenzoate, poly(4-vinyl-1-t-butoxycarbonyloxy-2-nitrobenzene), and poly (cyclohexyl 4-vinylbenzenesulfonate). Viewed in an ability to generate an acid and storage stability, however, the compounds represented by formulae (II) to (IV) are preferable in the invention.

$R^1$ in formula (II) represents an electron-attracting group having a Hammett's $\sigma_P$ value greater than 0. Examples of an electron-attracting group suitable for $R^1$ include acyl groups (such as acetyl, propanoyl, 2-methylpropanoyl, pivaroyl, benzoyl and naphthoyl groups), a cyano group, alkylsulfonyl groups (such as methanesulfonyl, ethanesulfonyl, benzylsulfonyl and t-butylsulfonyl groups) and arylsulfonyl groups (such as benzenesulfonyl group). Of these groups, acyl groups are preferred as $R^1$ over the others. $R^2$ represents an alkyl group (e.g., methyl, ethyl, isopropyl, octyl, dodecyl). The alkyl group preferred as $R^2$ contains at most 6 carbon atoms. $R^3$ represents a group eliminable by the action of heat or an acid, with suitable examples including secondary or tertiary alkyl groups having a hydrogen atom at the β-position (such as t-butyl, 1,1-dimethylpropyl, 1,1,3,3-tetramethylbutyl, cyclohexyl and 2-cyclohexenyl groups), silyl groups (such as trimethylsilyl and t-butyldimethylsilyl groups) and alkoxymethyl groups (such as methoxymethyl, octyloxymethyl, tetrahydropyranyl, tetrahydrofuranyl and 4,5-dihydro-2-methylfuran-5-yl groups). Of these groups, the secondary or tertiary alkyl groups having a hydrogen atom at the β-position are preferred as $R^3$. The groups represented by $R^1$, $R^2$ and $R^3$ may further have substituent groups. $W^1$ has the same meaning as in formula (I).

The compounds represented by formula (III) are illustrated below. $R^4$, $R^5$ and $R^6$ in formula (III) each independently represents a hydrogen atom, an alkyl group (e.g., methyl, ethyl, isopropyl, t-butyl, octyl, decyl) or an aryl group (e.g., phenyl, naphthyl). These groups represented by $R^4$, $R^5$ and $R^6$ may further have substituent groups. $R^4$ and $R^5$ or $R^6$ , or $R^5$ and $R^6$ may combine to forma ring. $W^1$ has the same meaning as in formula (I).

The compounds represented by formulae (II) and (III) respectively can be synthesized according to the methods described in JP-A-8-248561.

As one example of the compound releasing an acid by a mechanism differing entirely from those which control the acid release in the foregoing compounds, mention may be made of a compound having at least one substituent group eliminable by the action of heat or an acid and producing an acid by the intramolecular nucleophilic displacement reaction occurring subsequently to the elimination of the substituent group. Preferred embodiments of the compound of such a type are compounds represented by formula (IV):

$$P^2—X—L—C(R^7)(R^8)—OW^1 \qquad (IV)$$

wherein $P^2$ represents a substituent group eliminable by the action of heat or an acid, X represents O, S, $NR^9$ (wherein $R^9$ is a hydrogen atom or a group substitutable for hydrogen atom) or $CR^{10}R^{11}$ (wherein $R^{10}$ and $R^{11}$, which may be the same or different, each represents a hydrogen atom or a group substitutable for hydrogen atom), L represents a linkage group, $R^7$ and $R^8$, which may be the same or different, each represents a hydrogen atom or a group substitutable for hydrogen atom, and $W^1$ has the same meaning as in formula (II).

The substituent $P^2$ eliminable by the action of heat or an acid is introduced into a nucleophilic group, such as a hydroxyl group, a mercapto group, an amino group or a carbon atom, to prevent the intramolecular nucleophilic displacement reaction from occurring upon storage or in the unexposed area, but in the image area the substituent $P^2$ is decomposed and eliminated by the action of heat or an acid to enable the generation of an acid by the intramolecular nucleophilic displacement reaction.

Examples of a substituent group $P^2$ useful for introduction to an oxygen atom include alkoxycarbonyl groups (such as t-butoxycarbonyl, isopropyloxycarbonyl, 1-phenylethoxycarbonyl, 1,1-diophenylethoxycarbonyl and 2-cyclohexeneoxycarbonyl groups), alkoxymethyl groups (such as methoxymethyl, ethoxymethyl, n-octyloxymethyl, tetrahydropyranyl, tetrahydrofuranyl and 4,5-dihydro-2-methylfuran-5-yl groups), silyl groups (such as trimethylsilyl, triethylsilyl, t-butyldimethylsilyl, t-butyldiphenylsilyl and phenyldimethylsilyl groups) and secondary or tertiary alkyl groups having a hydrogen atom at each individual β-position (such as t-butyl, 1,1,-dimethylpropyl, 1,1,3,3-tetramethylbutyl, cyclohexyl and 2-cyclohexenyl groups). Examples of a substituent group $p^2$ useful for introduction to a sulfur atom include alkoxymethyl groups (such as isobutoxymethyl and tetrahyddropyranyl groups), alkoxycarbonyl groups (such as benzyloxycarbonyl and p-methoxybenzyloxycarbonyl groups), acyl groups (such as acetyl and benzoyl groups) and benzyl groups (such as p-methoxybenzyl, bis(4-methoxyphenyl) methyl and triphenylmethyl groups). Examples of a substituent group $P^2$ useful for introduction to a nitrogen atom include alkoxycarbonyl groups (such as t-butoxycarbonyl, cyclohexyloxycarbonyl, 2-(2-methyl)butoxycarbonyl, 2-(2-phenyl)propyloxycarbonyl and 2-chloroethoxycarbonyl groups), acyl groups (such as acetyl, benzoyl, 2-nitrobenzoyl, 4-chlorobenzoyl and 1-naphthoyl groups) and a formyl group. Examples of a substituent group $P^2$ useful for introduction to a carbon atom include tertiary alkoxycarbonyl groups (such as t-butoxycarbonyl group).

To the intramolecular nucleophilic displacement reaction occurring subsequently to the elimination of the substituent $P^2$ , the configuration capable of forming a 5- to 10-membered ring, especially a 5- or 6-memebered ring, is advantageous. Therefore, it is desirable that the linkage group L be chosen so as to enable the formation of a ring of such a size.

The acid generator used in the present invention may be a polymer formed by introducing a polymerizing group to a substitutable position thereof and coupling more than one polymerizing group together. In the case of applying an acid generator to a material recording images by utilizing a change caused in hue by the action of an acid, which is described below, the polymeric acid generator is favorable for thinning the image recording layer because it can provide coatability without using other binders. It is desirable for the polymeric acid generator to have its molecular weight in the range of 1,000 to 1,000,000, more preferably 2,000 to 500,000, most preferably 2,000 to 300,000. Such a polymeric acid generator may be a homopolymer or a copolymer with other monomers.

Examples of the present compounds represented by formulae (I) to (IV) respectively are illustrated below, but it should be understood that these examples are not to be construed as limiting the scope of the invention in any way.

S-(1)

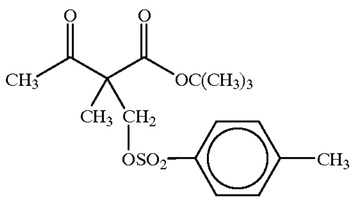

-continued
S-(2)
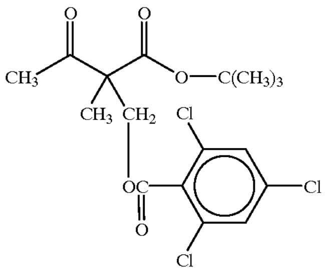
S-(3)
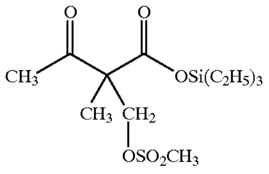
S-(4)
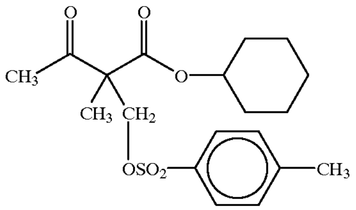
S-(5)
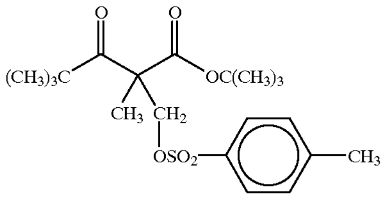
S-(6)
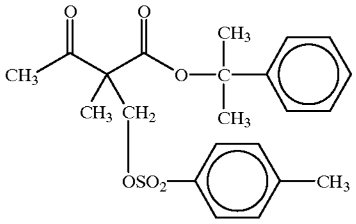
S-(7)
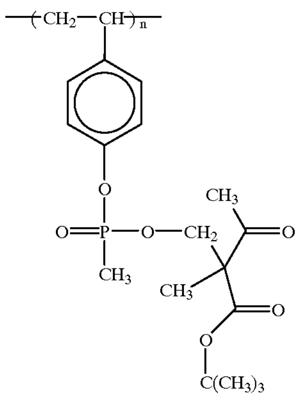
-continued
S-(8)
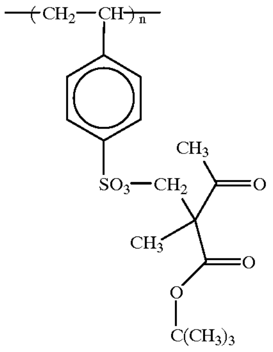
S-(9)
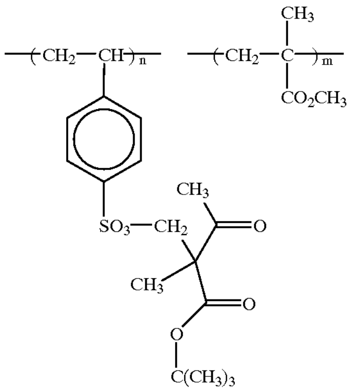
S-(10)
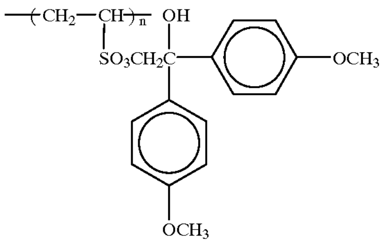
S-(11)
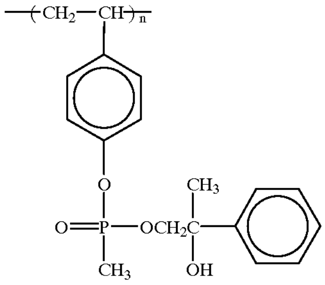

-continued
S-(12)
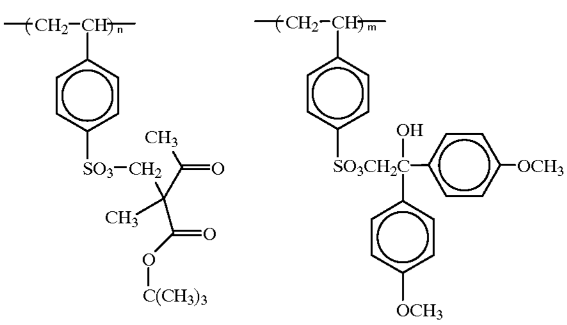
S-(13)
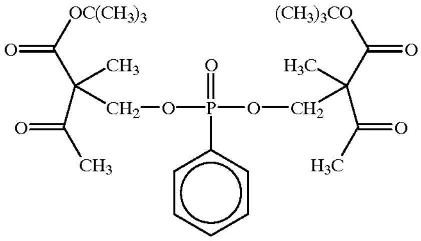
S-(14)
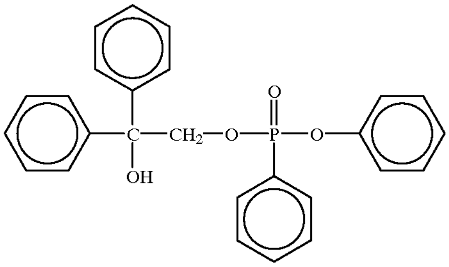
-continued
S-(15)
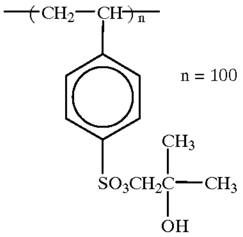
S-(16)
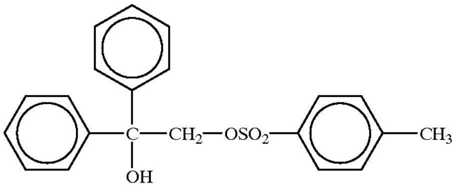
S-(17)
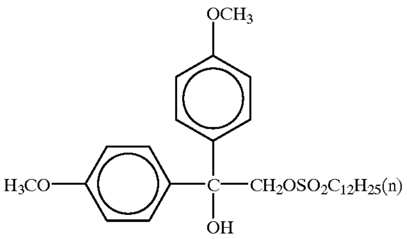
S-(18)
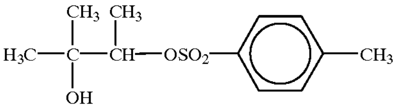
S-(19)
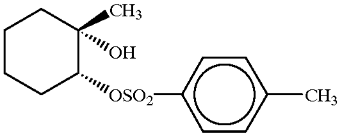
| | $W^2—O—(CH_2)_n—OP^2$ | | |
|---|---|---|---|
| | $W^2$ | n | $P^2$ |
| S-(20) | 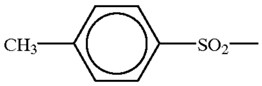 | 4 | 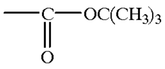 |
| S-(21) | " | 4 | $—CH_2OC_8H_{17}$ |
| S-(22) | " | 4 | $—Si(CH_3)_2C(CH_3)_3$ |
| S-(23) | 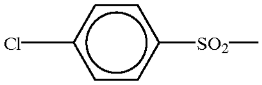 | 4 | 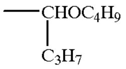 |
| S-(24) | $C_8H_{17}SO_2—$ | 4 | 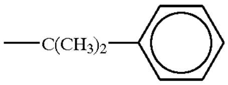 |

-continued
| | $W^2—O—(CH_2)_n—OP^2$ | | |
|---|---|---|---|
| | $W^2$ | n | $P^2$ |
| S-(25) | 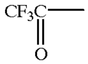 | 5 | $—CH_2OC_{12}H_{25}$ |
| S-(26) | 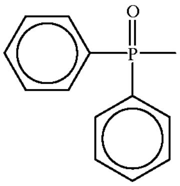 | 4 | " |
| S-(27) | 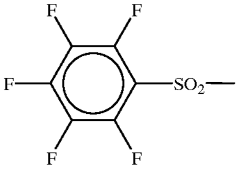 | 5 | " |
S-(28)
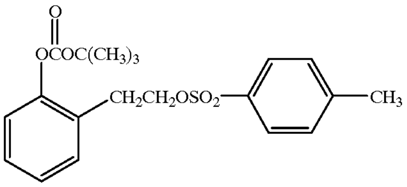
S-(29)
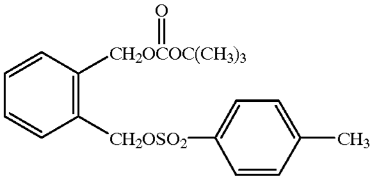
S-(30)
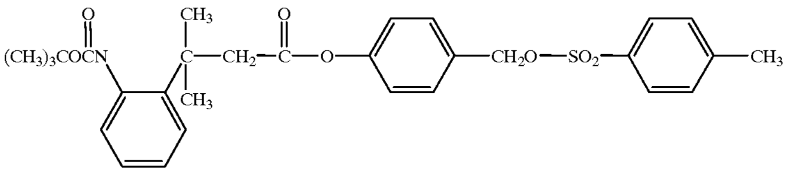
S-(31)
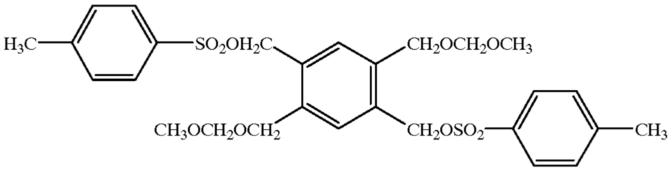

-continued
S-(32)
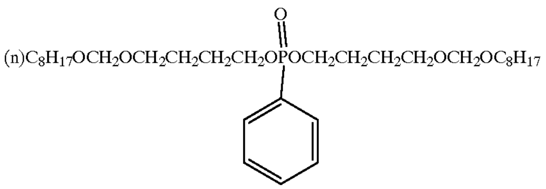
S-(33)
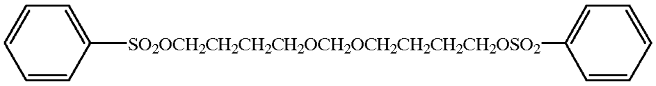
S-(34)
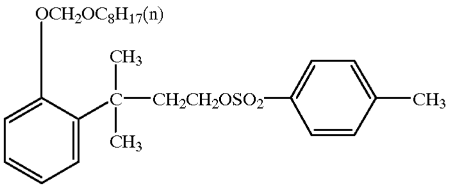
S-(35)
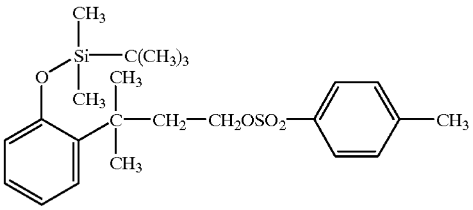
S-(36)
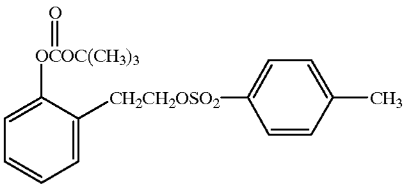
S-(37)
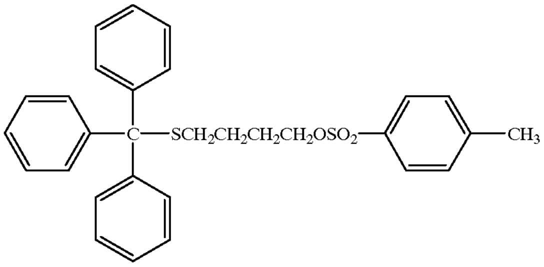
S-(38)
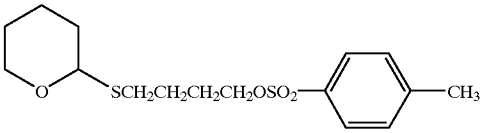

-continued

S-(39)

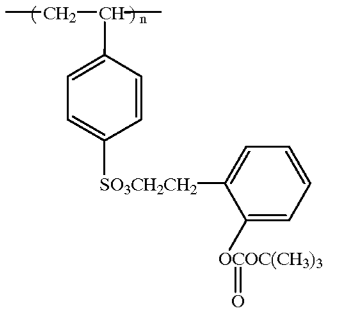

n = 100

S-(40)

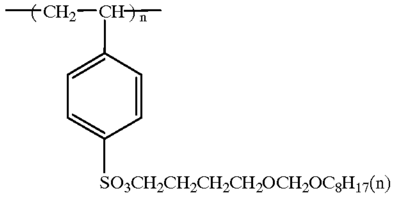

n = 100

S-(41)

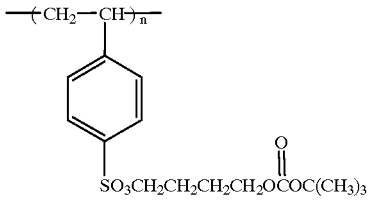

n = 100

S-(42)

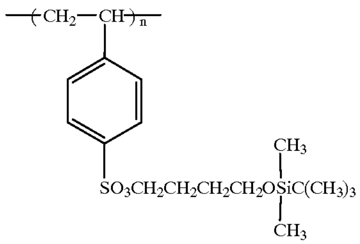

n = 100

S-(43)

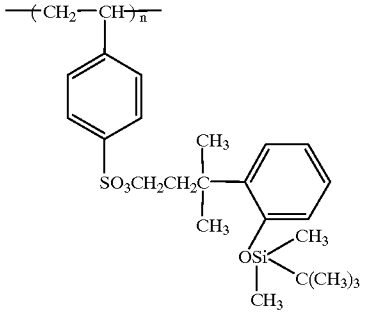

n = 100

Further, n in S-(39) to S-(43) represents a weight % of the monomer.

The amount of these acid generators added, though it depends on the species of a compound capable of forming a dye by the reaction with an acid, is preferably from 0.001 to 20 equivalents, particularly preferably from 0.01 to 5 equivalents, to the compound capable of forming a dye by the reaction with an acid.

In the present invention, as to the compound capable of forming a dye by the reaction with an acid, it is preferred to use a compound capable of undergoing a change in its absorption when an acid acts thereon, especially a compound capable of causing an intramolecular or intermolecular reaction under the action of an acid to undergo a change in the absorption region of 360 to 900 nm.

In the present invention, a compound undergoing a change in the absorption region of 360 to 900 nm through the intra- or intermolecular reaction caused by the action of an acid is a compound which is stable as long as it is kept under a neutral or basic condition but, when an acid acts thereon, causes the lowering of activation energy for intra- or intermolecular reaction to enable smooth progress of the reaction under heating, and thereby can produce an absorption change in the foregoing wavelength region. The heating temperature suitable for the image formation by the aforementioned mechanism is from 60° C. to 200° C., especially from 80° C. to 140° C.

The compound accompanied by such an absorption change may be a single compound, or it may be constituted of two or more components. Examples thereof include a compound which undergoes Diels-Alder reaction to form an image by color vanishing in the foregoing region (such as the compound decomposable into 9,10-distyrylanthracene and maleic anhydride, or the compound decomposable into tetraphenylcyclopentadiene and an acrylic acid ester), the combination of compounds which undergo retro-Diels-Alder reaction to form an image by color developing in the foregoing region (such as the combination forming an adduct of 9,10-distyrylanthracene and maleic anhydride, or the combination forming an adduct of diphenylisobenzofuran and acrylamide), a compound which can extend the length of its conjugated system by the elimination of β-hydrogen therefrom to form a developed color image in the foregoing region (such as 1-acetoxy-1,2-diarylethane or 1-sulfoxy-1,2-diarylethane), the combination of an aldehyde and an active methylene compound which undergoes dehydration condensation to form a developed color image in the foregoing region (such as the combination of a four-equivalent magenta coupler and p-methoxycinnamaldehyde) , and a compound which contains an amino or hydroxyl group substituted by a group whose decomposition or elimination is accelerated by the action of an acid and changes its absorption in the foregoing region when the substituent group is removed therefrom. In addition, basic leuco dyes developing their colors momentarily upon contact with an acid are also usable in the present image-forming material. However, such compounds function as base to inhibit the acid multiplication process. Therefore, it is necessary that such a basic compound be isolated from acid generators and acid multipliers by utilizing a microencapsulation technique or coating them in separate layers.

The compounds especially useful in the present invention are compounds of the kind which contain an amino or hydroxyl group having a substituent decomposable or eliminable by the action of an acid and changes their absorption change through the decomposition or elimination of the substituent.

Suitable examples of a substituent attached to an amino group include alkoxycarbonyl groups (such as t-butoxycarbonyl, cyclohexyloxycarbonyl, 2-(2-methyl) butoxycarbonyl, 2-(2-pheny)propyloxycarbonyl and 2-chloroethoxycarbonyl groups), acyl groups (e.g., acetyl, benzoyl, 2-nitrobenzoyl, 4-chlorobenzoyl and 1-naphthoyl groups) and a formyl group. Of these groups, the alkoxycarbonyl groups having a hydrogen atom at the β-position are useful in particular from the viewpoints of storage stability and heat sensitivity. Examples of a compound having such a substituted amino group are described, e.g., in U.S. Pat. Nos. 4,602,263 and 4,826,976. By combining those compounds with the present thermoacid generators and acid multipliers, higher sensitivity and more excellent keeping quality can be imparted to heat-sensitive recording materials.

Suitable examples of an acid-decomposable or eliminable substituent attached to a hydroxyl group include secondary or tertiary alikoxycarbonyl groups having a hydrogen atom at the β-position (such as t-butoxycarbonyl, isopropyloxycarbonyl, 1-phenylethoxycarbonyl, 1,1-diphenylethoxycarbonyl and 2-cyclohexeneoxycarbonyl groups), silyl groups (such as trimethylsilyl, triethylsilyl, t-butyldimethylsilyl, t-butyldiphenylsilyl and phenyldimethylsilyl groups), alkoxymethyl groups (such as methoxymethyl, ethoxymethyl, 1-methoxyethyl, 1-phenoxyethyl and 2-(2-methoxy)propyl groups) and secondary or tertiary alkyl groups having a hydrogen atom at the β-position (such as tetrahydropyranyl, tetrahydrofuranyl, 4,5-dihydroxy2-methylfuran-5-yl, t-butyl and 2-cyclohexenyl groups). In particular, the secondary or tertiary alkoxycarbonyl groups having a hydrogen atom at the β-position are preferred over the others in the present invention.

Examples of a compound changing its absorption by the decomposition of a substituent attached to the hydroxyl group present therein are described, e.g., in U.S. Pat. No. 5,243,052 and JP-A-9-25360.

Examples of compounds undergoing a change in the absorption region of 360–900 nm through the intra- or intermolecular reaction caused by the action of an acid are illustrated below, but it should be understood that these examples are not to be construed as limiting the scope of the invention.

LD-(1)

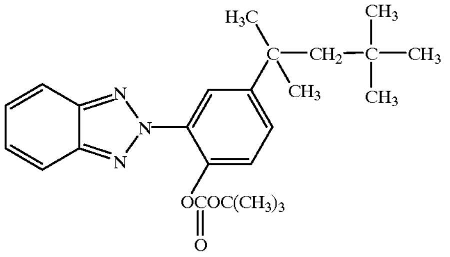

LD-(2)

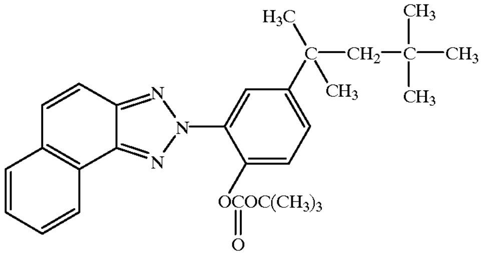

LD-(3)

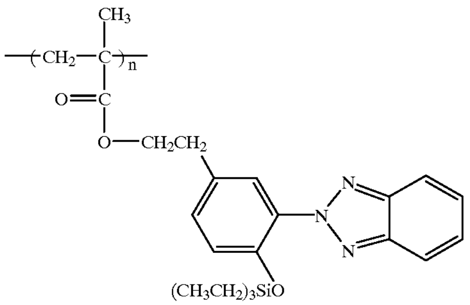

-continued
LD-(4)
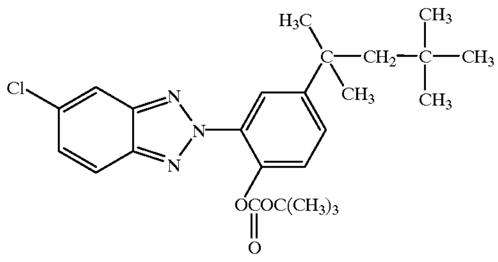
LD-(5)
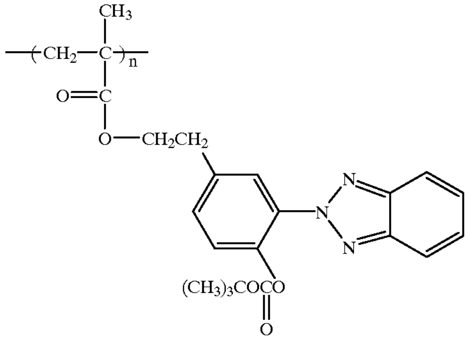
LD-(6)
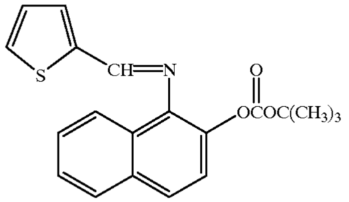
LD-(7)
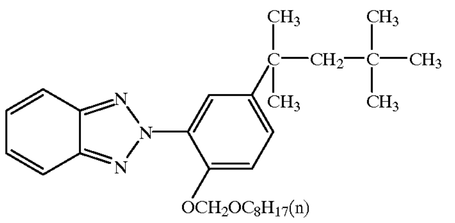
LD-(8)
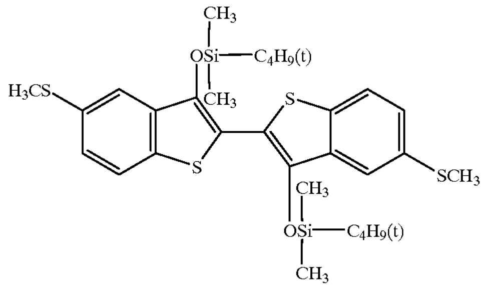
LD-(9)
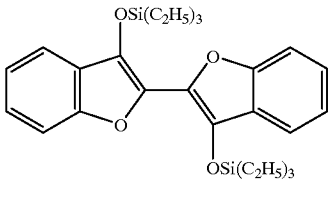
-continued
LD-(10)
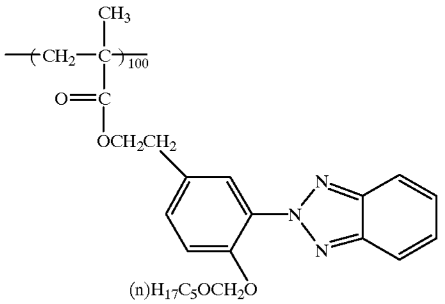
LD-(11)
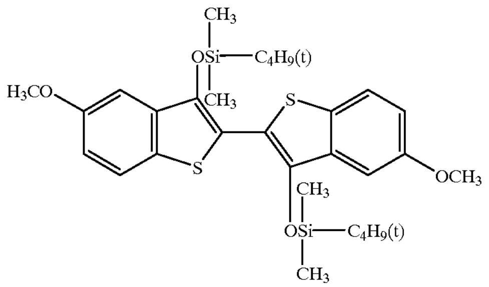
LD-(12)
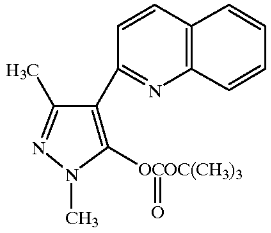
LD-(13)
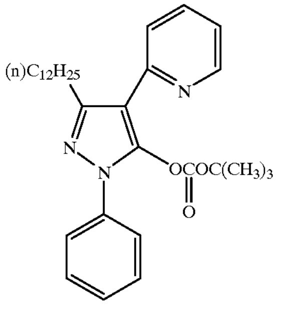
LD-(14)
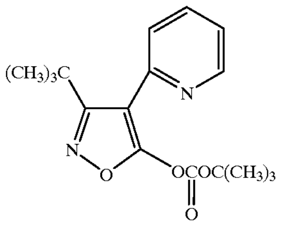

-continued
LD-(15)
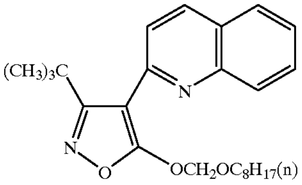
LD-(16)
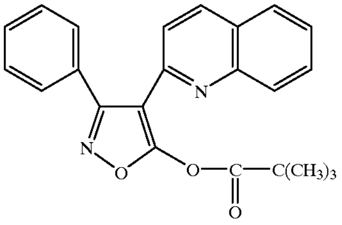
LD-(17)
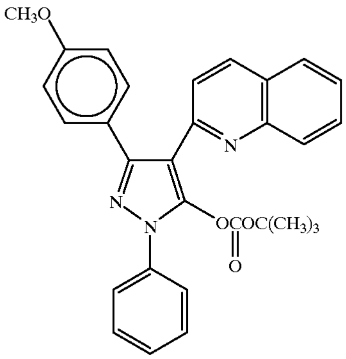
LD-(18)
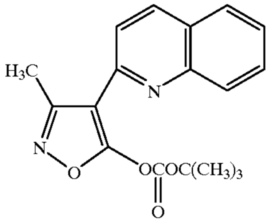
LD-(19)
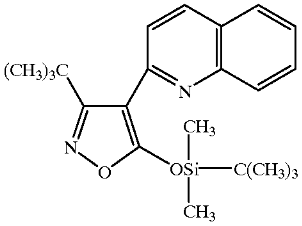
LD-(20)
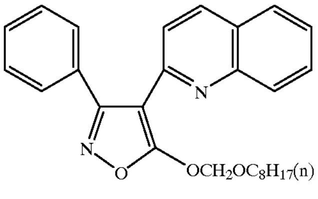
-continued
LD-(21)
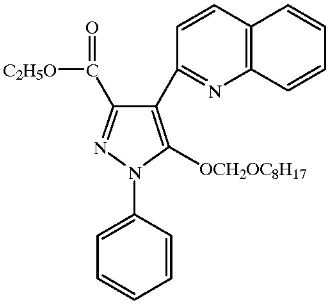
LD-(22)
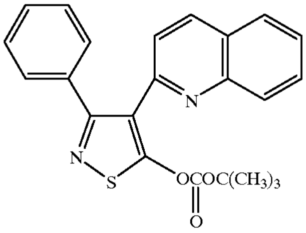
LD-(23)
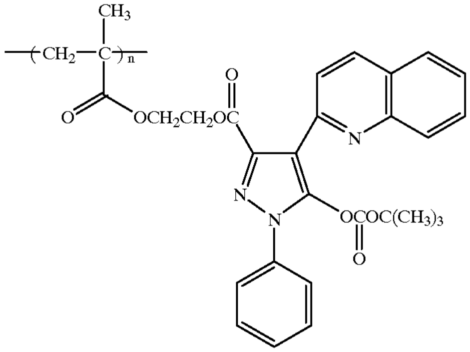
LD-(24)
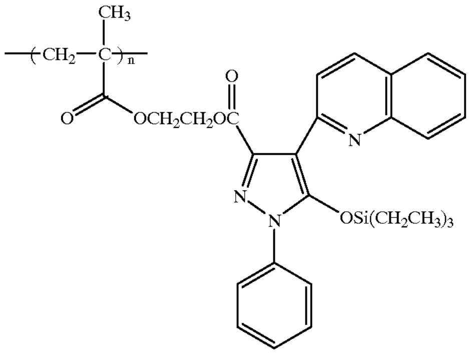
LD-(25)
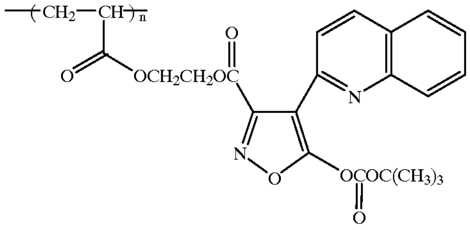

-continued
LD-(26)
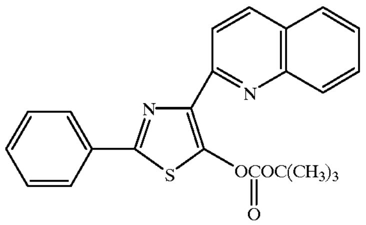
LD-(27)
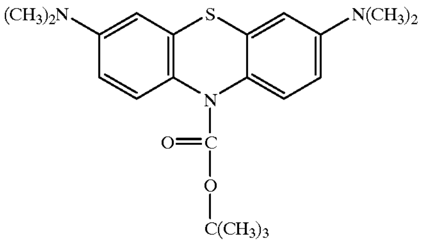
LD-(28)
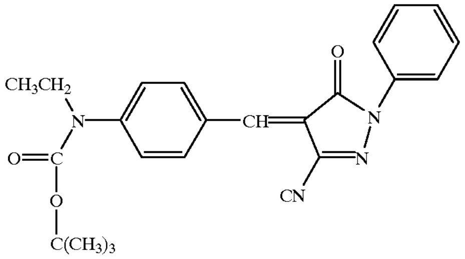
LD-(29)
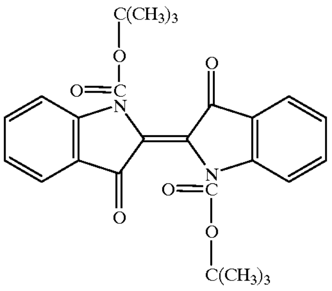
LD-(30)
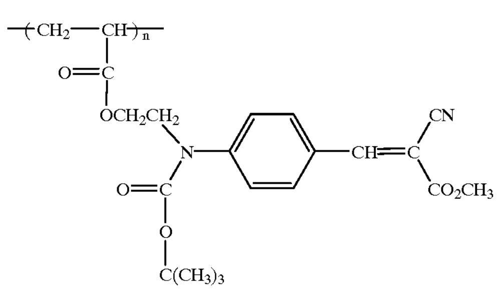
-continued
LD-(31)
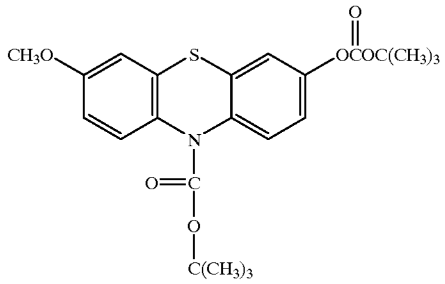
LD-(32)
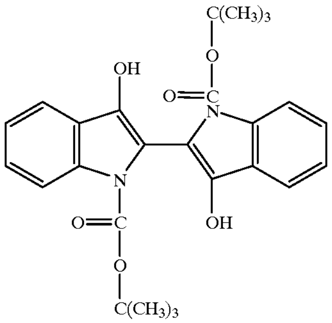
LD-(33)
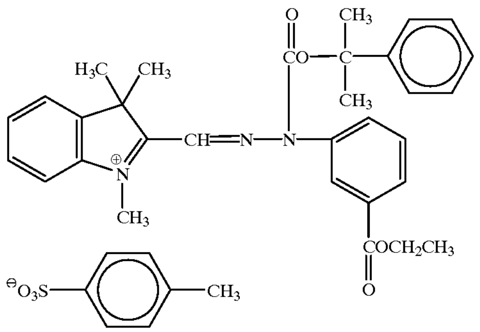
LD-(34)
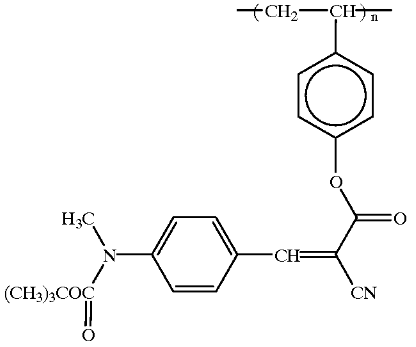
Further, weight-average molecular weights of LD-(3) LD-(5), LD-(23), LD-(24), LD-(25), LD-(30) and LD-(34) are 500, 5000, 30000, 24000, 35000, 20000 and 20000, respectively.

The present image recording material is generally produced by coating on a support the combination of an acid generator as recited above, an acid multiplicative agent and a composition undergoing a change in the absorption region of 360–900 nm when an acid acts thereon.

Therein, such a combination is generally coated together with a binder, except for the case in which either of image-recording components is a polymer or amorphous matter having good coatability. When the coating can be effected without binder, it is easy to reduce the thickness of an image-recording layer. As a result, sharp images can be recorded.

Examples of a binder usable for coating the image-recording components include both water-soluble binder (such as gelatin, caein, starch, hydroxyethyl cellulose, carboxymethyl cellulose, polyvinyl alcohol, polyacrylamide or copolymer of ethylene and maleic anhydride) and water-insoluble binder (such as polyvinyl butyral, triacetyl cellulose, polystyrene, copolymer of methyl acrylate and butadiene, copolymer of acrylonitrile and butadiene).

Further, it is expected that the polymerization of an acid generator for use as a binder such as the polymer of formula (V) or the copolymerization of an acid generator and a compound capable of changing its hue by developing or vanishing a color when an acid acts thereon can increase the sensitivity for a reason that the acid generation occurs in the close vicinity of the compound capable of changing its hue. In addition, the diffusion of molecules can be controlled by polymerization to effect improvements in image sharpness and keeping quality. In particular, these features are suitable for the use requiring high image quality, such as graphic arts film. As to the compounds produced by such copolymerization, copolymers represented by formula (V) are preferred.

The following is a detailed explanation of formula (V).

A in formula (V) represents a constitutional unit repeated in the polymerization of at least one vinyl monomer functioning as an acid generator by the action of heat or an acid. The vinyl monomer having such a function can be derived by introducing a polymerizable group in an appropriate position of any of the compounds represented by the foregoing formulae (I) to (IV).

Examples of a vinyl monomer from which A in formula (V) can be derived are illustrated below, but these examples should not be construed as limiting the scope of the invention in any way. Additionally, these monomers can be synthesized in the same manners as described in JP-A-8-248561.

A-(1)

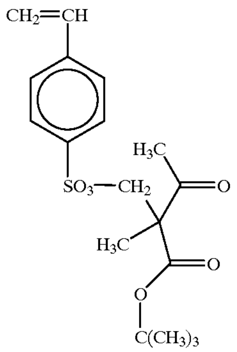

A-(2)

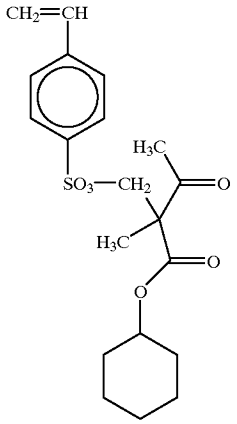

A-(3)

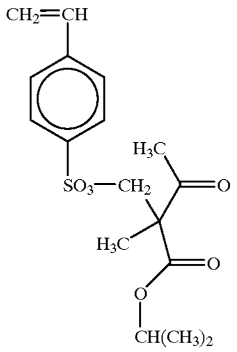

A-(4)

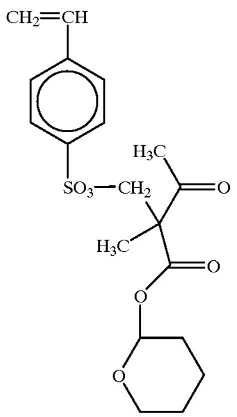

A-(5)
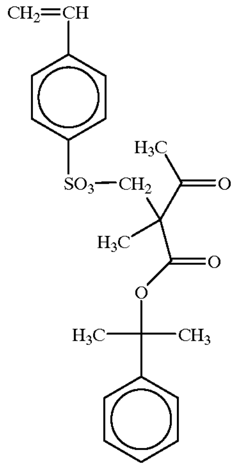
A-(6)
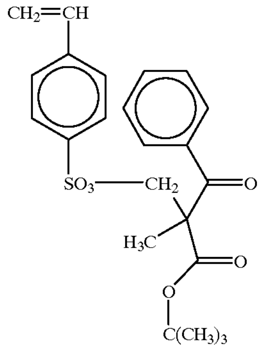
A-(7)
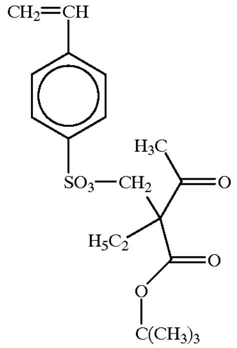
A-(8)
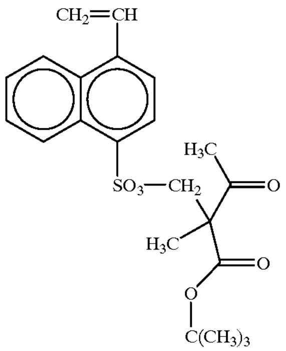
A-(9)
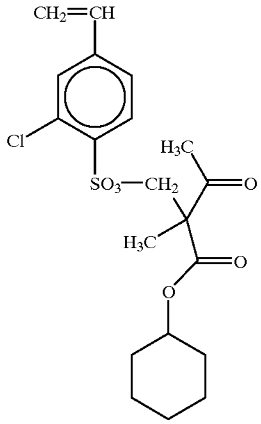
A-(10)
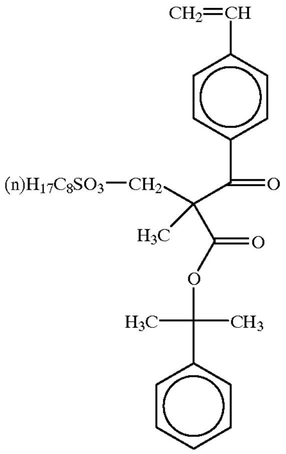
A-(11)
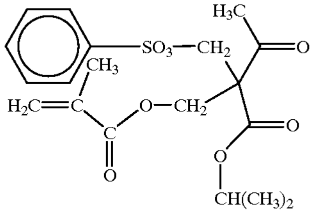
A-(12)
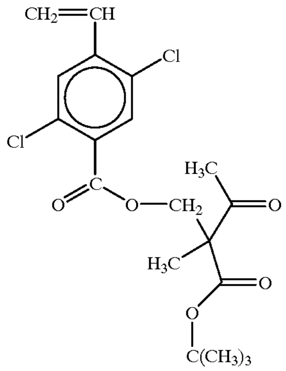

-continued
A-(13)
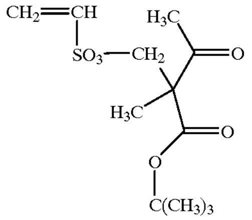
A-(14)
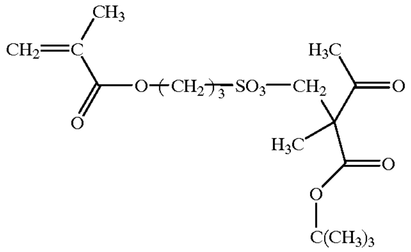
A-(15)
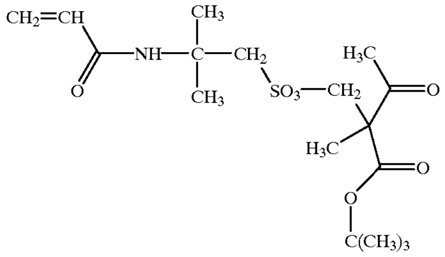
A-(16)
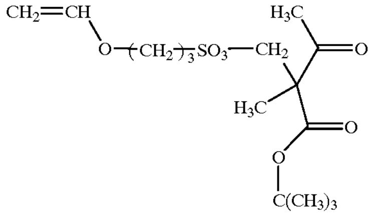
A-(17)
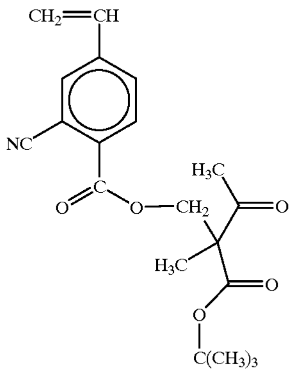
-continued
A-(18)
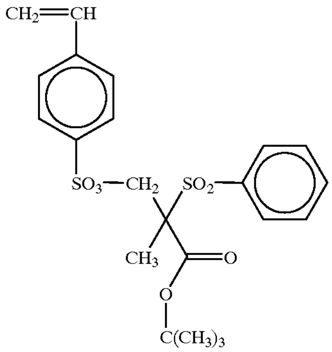
A-(19)
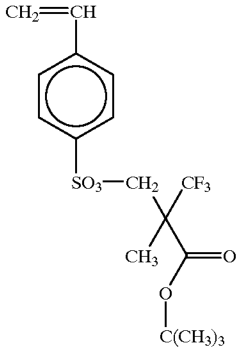
A-(20)
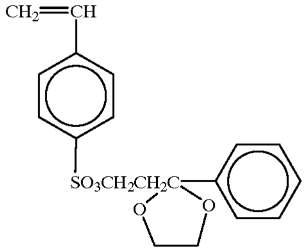
A-(21)
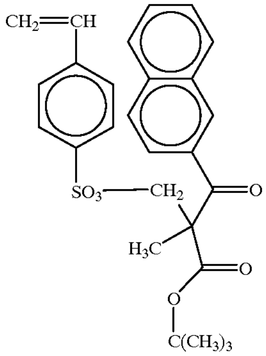
A-(22)
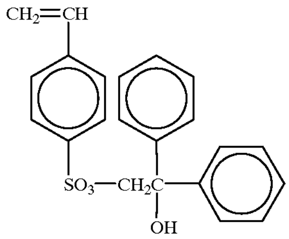

-continued
A-(23)
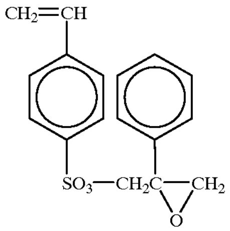
A-(24)
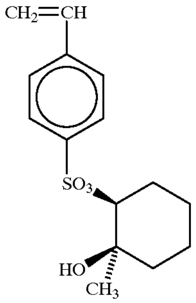
A-(25)
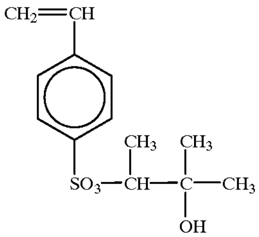
A-(26)
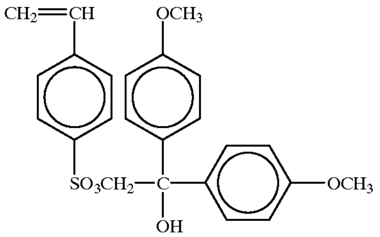
A-(27)
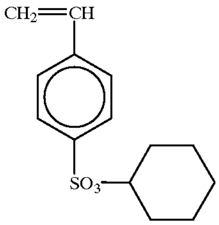
A-(28)
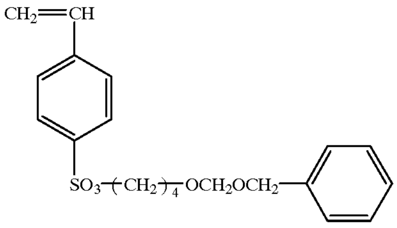
-continued
A-(29)
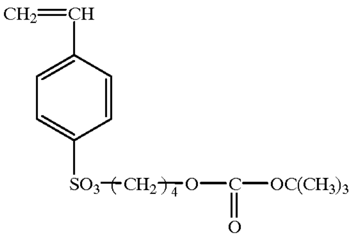
A-(30)
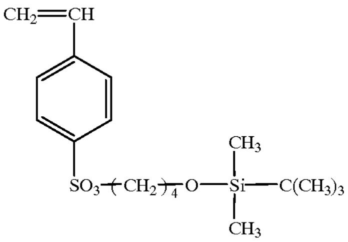
A-(31)
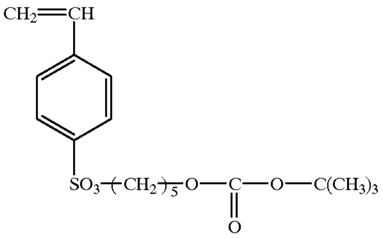
A-(32)
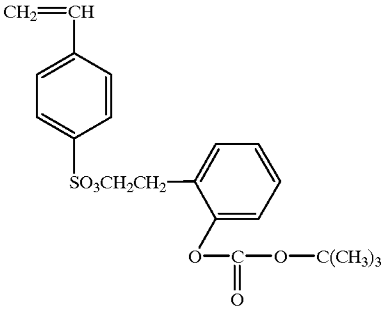
A-(33)
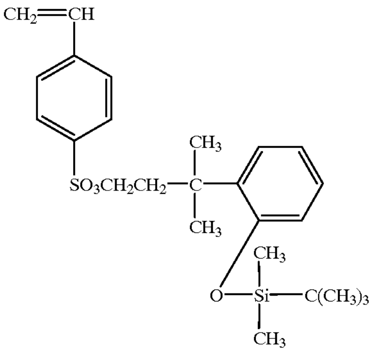

-continued

A-(34)

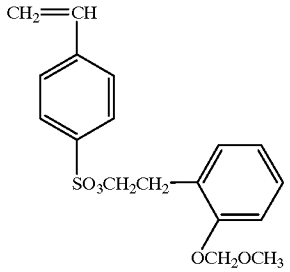

B in formula (V) represents a constitutional unit repeated in the polymerization of at least one vinyl monomer having a partial structure undergoing a change in the absorption region of 360–900 nm when an acid acts thereon. Such a vinyl monomer is a compound derived by the introduction of a polymerizable group in an appropriate position of any of the aforementioned compounds of the kind which undergo an absorption change when an acid acts thereon. Examples of a vinyl monomer from which B in formula (V) can be derived are illustrated below, but these examples should not be construed as limiting the scope of the present invention in any way.

B-(1)

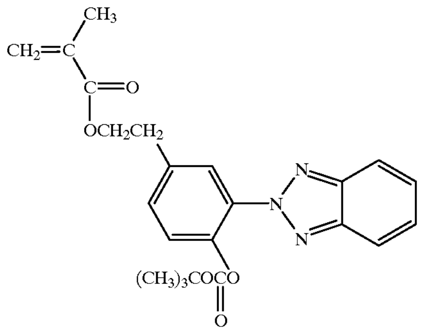

B-(2)

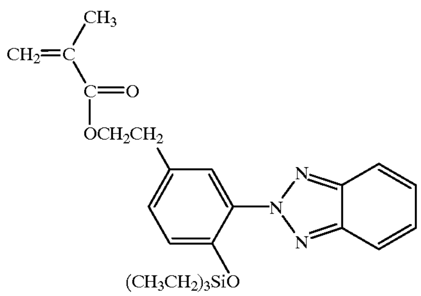

-continued

B-(3)

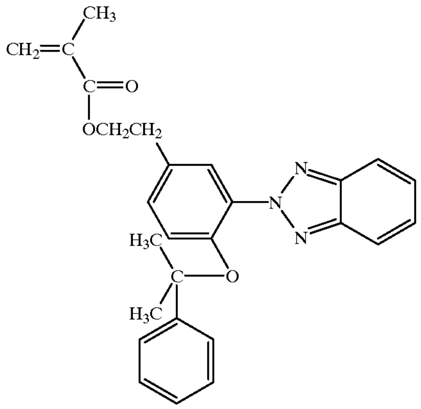

B-(4)

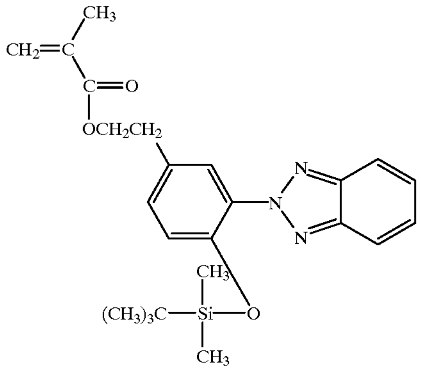

B-(5)

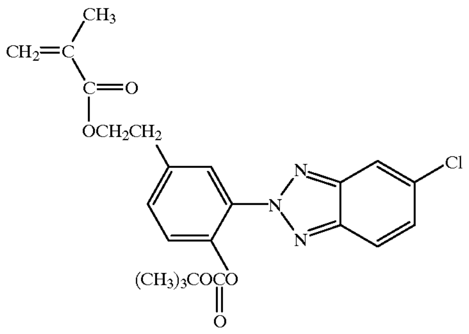

B-(6)

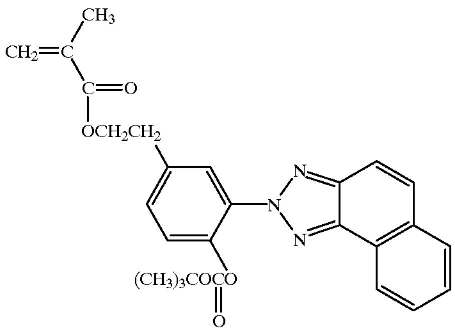

-continued
B-(7)
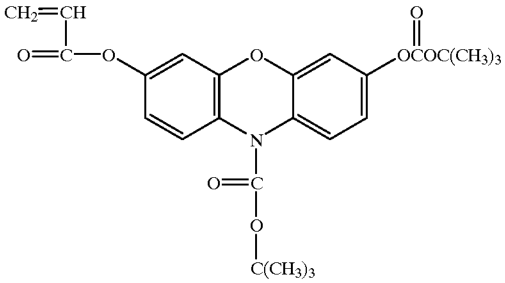
B-(8)
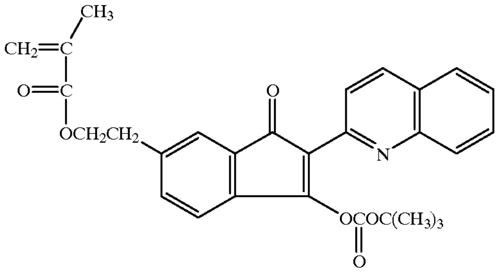
B-(9)
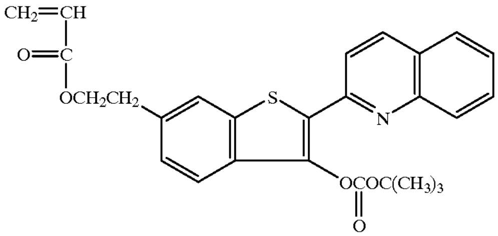
B-(10)
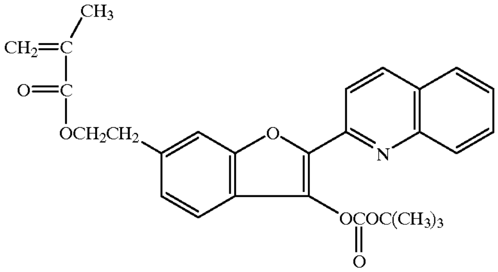
B-(11)
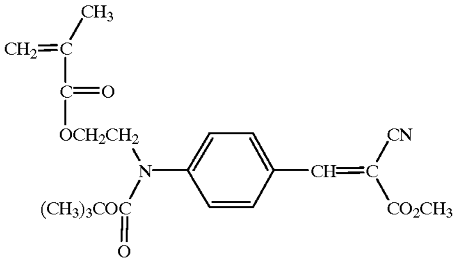
-continued
B-(12)
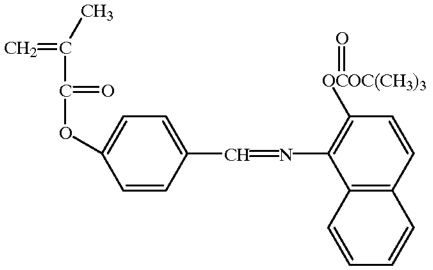
B-(13)
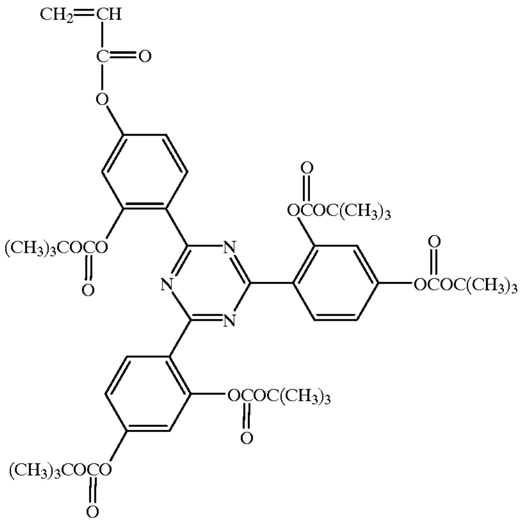
B-(14)
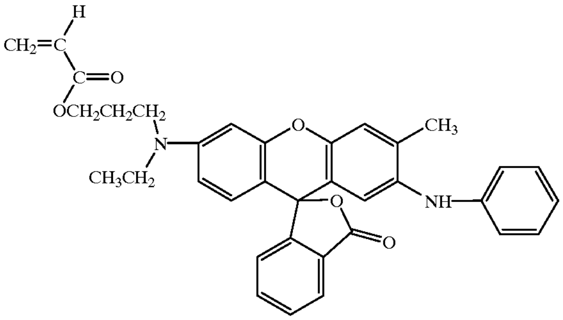
B-(15)
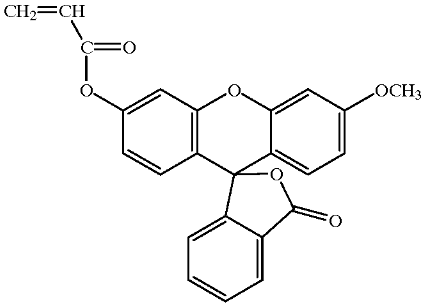

-continued

B-(16)

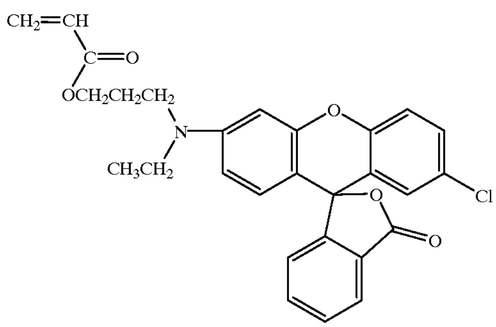

B-(17)

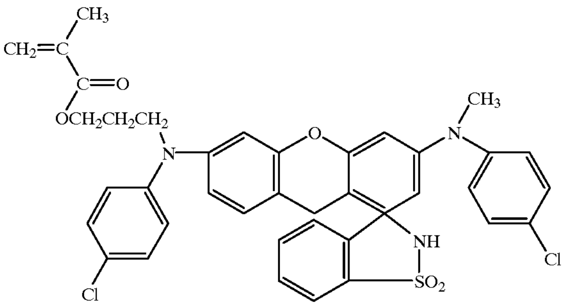

B-(18)

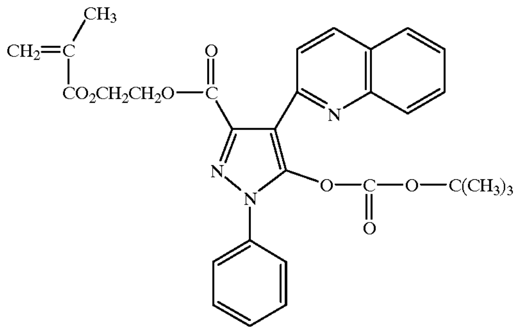

B-(19)

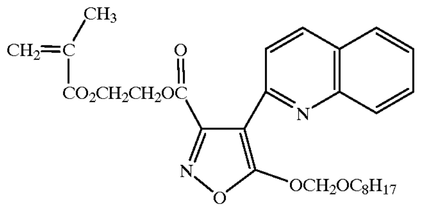

B-(20)

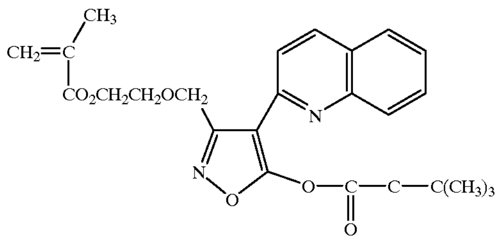

-continued

B-(21)

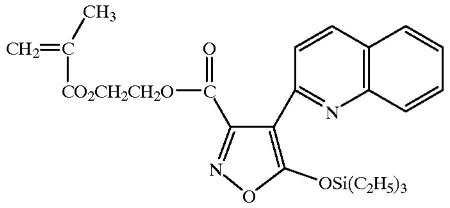

B-(22)

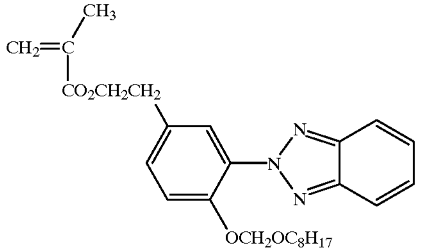

C in formula (V) represents a constitutional unit repeated in the polymerization of at least one vinyl monomer capable of copolymerizing with the vinyl monomers from which A and B are derived, and enables the control of storage stability and color developing activity through the adjustment of the polarity and the glass transition temperature of the resulting polymer. For such a purpose, two or more kinds of vinyl monomers may be employed in combination. Suitable examples thereof include acrylic acid esters, methacrylic acid esters, acrylamides, styrenes and vinyl ethers. More specifically, the following are examples of vinyl monomers from which C can be derived. However, these examples should not be construed as limiting the scope of the invention.

C-(1)

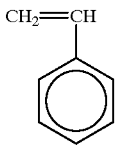

C-(2)

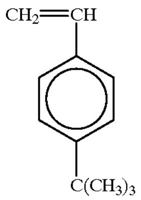

C-(3)

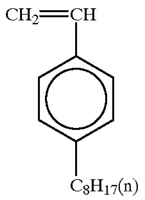

-continued
C-(4)
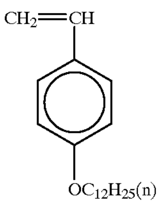
C-(5)
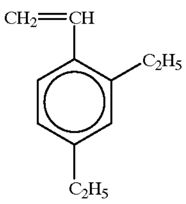
C-(6)
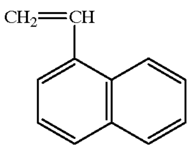
C-(7)
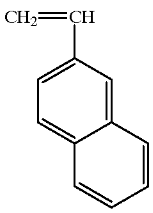
C-(8)
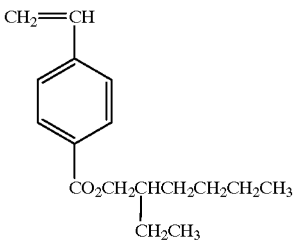
C-(9)
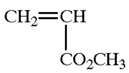
C-(10)
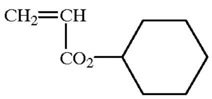
C-(11)
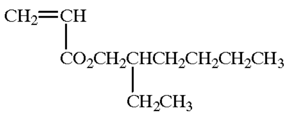
C-(12)
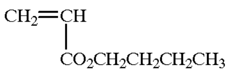
-continued
C-(13)
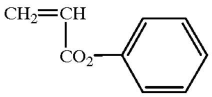
C-(14)
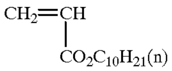
C-(15)
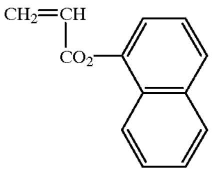
C-(16)
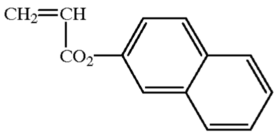
C-(17)
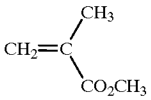
C-(18)
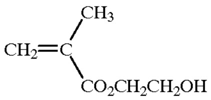
C-(19)
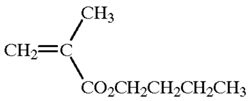
C-(20)
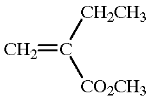
C-(21)
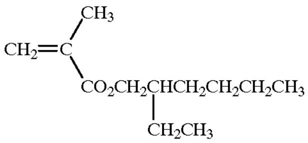
C-(22)
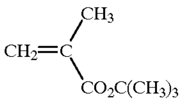
C-(23)
C-(24)
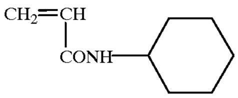

-continued

C-(25)

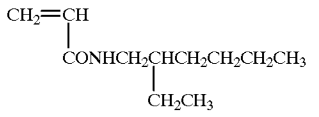

C-(26)

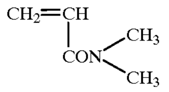

C-(27)

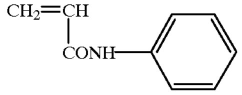

C-(28)

C-(29)

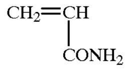

C-(30)

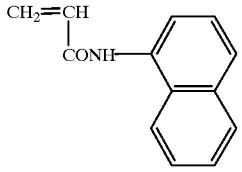

C-(31)

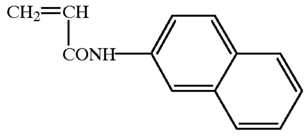

C-(32)

C-(33)

C-(34)

C-(35)

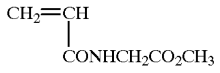

C-(36)

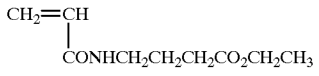

C-(37)

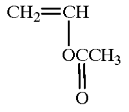

C-(38)

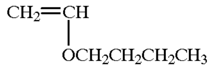

-continued

C-(39)

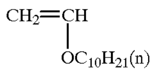

C-(40)

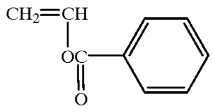

C-(41)

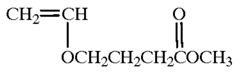

C-(42)

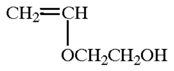

C-(43)

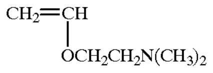

C-(44)

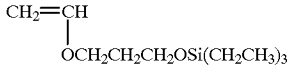

C-(45)

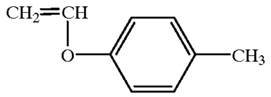

C-(46)

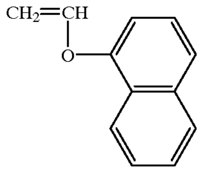

C-(47)

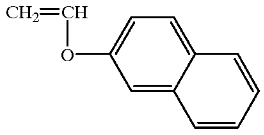

C-(48)

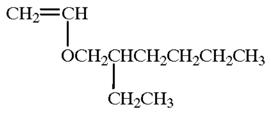

x, y and z in formula (V) represent percentages by weight of constitutional units A, B and C respectively, and have the following relations, $1 \leqq x \leqq 100$, $0 \leqq y \leqq 99$, $0 \leqq z \leqq 99$ and $x+y+z=100$.

The suitable weight-average molecular weight of a polymer. represented by formula (V) is from 1,000 to 1,000,000, particularly from 2,000 to 100,000. Such a polymer may have any of copolymerization forms, including the forms of random copolymer, alternate copolymer and block copolymer. In general, however, the polymer has the form of random copolymer because the synthesis thereof is easy.

Suitable examples of a combination of monomers from which A, B and C in the polymer of formula (V) are derived and the percentages of monomers in each combination, x, y and z, are shown in Table 1. However, the invention should not be construed as being limited to these examples.

TABLE 1

| | A | B | C | x | y | z |
|---|---|---|---|---|---|---|
| P-(1) | A-(1) | B-(22) | — | 20 | 80 | — |
| P-(2) | A-(1) | B-(22) | — | 50 | 50 | — |
| P-(3) | A-(1) | B-(22) | — | 67 | 33 | — |
| P-(4) | A-(1) | B-(22) | — | 80 | 20 | — |
| P-(5) | A-(1) | B-(1) | — | 20 | 80 | — |
| P-(6) | A-(1) | B-(1) | — | 50 | 50 | — |
| P-(7) | A-(1) | B-(22) | C-(1) | 40 | 40 | 20 |
| P-(8) | A-(1) | B-(22) | C-(22) | 40 | 40 | 20 |
| P-(9) | A-(1) | B-(22) | C-(18) | 40 | 40 | 20 |
| P-(10) | A-(1) | B-(22) | C-(37) | 40 | 40 | 20 |
| P-(11) | A-(1) | B-(18) | — | 50 | 50 | — |
| P-(12) | A-(1) | B-(18) | — | 67 | 33 | — |
| P-(13) | A-(1) | B-(19) | — | 50 | 50 | — |
| P-(14) | A-(1) | B-(19) | — | 67 | 33 | — |
| P-(15) | A-(1) | B-(19) | C-(22) | 40 | 40 | 20 |
| P-(16) | A-(1) | B-(14) | — | 67 | 33 | — |
| P-(17) | A-(1) | B-(14) | — | 83 | 17 | — |
| P-(18) | A-(14) | B-(1) | — | 50 | 50 | — |
| P-(19) | A-(14) | B-(22) | — | 50 | 50 | — |
| P-(20) | A-(14) | B-(19) | — | 50 | 50 | — |
| P-(21) | A-(14) | B-(14) | — | 67 | 33 | — |
| P-(22) | A-(30) | B-(22) | — | 50 | 50 | — |
| P-(23) | A-(33) | B-(19) | — | 50 | 50 | — |

The present polymers can be synthesized using various polymerization methods, such as solution polymerization, precipitation polymerization, suspension polymerization, block polymerization and emulsion polymerization. For the initiation of polymerization, a method of using a radical initiator or a method of irradiating with light or radiation can be adopted. Those methods for polymerization and initiation of polymerization are described in books, e.g., Teiji Tsuruta, *Kobunshi Gosei Hoho (which means "Methods of Synthesizing Polymers",* revised edition, Nikkan Kogyo Shinbunsha (1971), and T. Otsu & M. Kinoshita, Kobunshi Gosei no Jikkenho (which means "Experimental Methods for Polymer Synthesis"), pages 124–154, Kagaku Dojin (1972).

Of the foregoing polymerization methods, the solution polymerization using a radical initiator is preferred over the others. As to the solvent used in the solution polymerization, various organic solvents, such as ethyl acetate, methanol, ethanol, 1-propanol, 2-propanol, 1-butanol, acetone, dioxane, N,N-dimethylformamide, N,N-dimethylacetamide, benzene, toluene, acetonitrile, methylene chloride, chloroform and dichloroethane, can be used independently, in combination with two or more thereof, or as a mixture with water.

The polymerization temperature is required to be determined depending on the desired molecular weight of the polymer to be produced and the kind of the polymerization initiator used, and it can be chosen from the range of not more than 0° C. to 120° C. or more. Usually the solution polymerization is carried out at a temperature ranging from 30° C. to 100° C.; while in the invention it is desirable for the polymerization to be performed in the temperature range of 30–90° C., because the monomer(s), from which the unit A in formula (V) is (are) derived, has (have) the possibility of decomposing at high temperatures.

Suitable examples of a radical initiator used in the polymerization include initiators of azo type, such as 2,2'-azobisisobutyronitrile, 2,2'-azobis(2,4-dimethylvaleronitrile), 2,2'-azobis(2-amidinopropane) dihydrochloride and 4,4'-azobis(4-cyanopentanoic acid), and initiators of peroxide type, such as benzoyl peroxide, t-butyl hydroperoxide and potassium persulfate (which may be used, e.g., as a redox initiator in combination with sodium hydrogen sulite). Of these initiators, the initiators which have the half-decay time of 10 hours at a temperature of 70° C. or below (e.g., 2,2'-azobis(2,4-dimethylvaleronitrile), 2,2'-azobis(4-methoxy-2,4-dimethylvaleronitrile), dimethyl 2,2-azobis(2-methylpropionate), 2,2'-azobis[2-(3,4,5,6-tetrahydropropane)]dihydrochloride) are preferred over the others in the invention.

The suitable amount of polymerization initiator used, though it can be controlled depending on the polymerizability of monomers and the molecular weight required for the polymer produced, is from 0.01 to 5.0 mole % to the monomers.

In the syntheses of the present polymers, an initiator may be thrown into a reaction vessel in which the mixture of monomers from which the units A, B and C are derived is placed in advance, or the polymerization may be carried out via the process of dripping the monomers into a polymerization solvent.

By coating a polymer represented by formula (V) on a support, an image recording material according to the invention can be obtained. As the polymer of formula (V) functions as a thermoacid generator also, the image recording material obtained undergoes a change in the absorption region by only application of heat thereto; as a result, it can have excellent sensitivity and image sharpness when employed as heat-sensitive recording material. Further, the image recording material of the foregoing kind doesn't need the so-called binder, and so it can have a reduced thickness to provide images of high definition, and becomes hard to undergo abrasion. However, the polymers represented by formula (V) may be employed together with a binder, if desired. Examples of a binder usable therein include those recited hereinbefore.

To image recording materials according to the invention, a small amount of base can be added for the purpose of enhancing the storage stability, a compound capable of generating an acid by the action of light or heat can further be added for the purpose of heightening the sensitivity, and various additives, such as a pigment, an antioxidant and a sticking inhibitor, can be added, if desired. Furthermore, an overcoat layer may be provided in order to protect the image-recording layer, and a backing layer may be provided on the back side of the support. In addition, various techniques known to heat-sensitive recording material, including the formation of a single or multiple undercoat layer made up of pigment or resin binder between the image-recording layer and the support, can be employed.

In the invention, the image recording layer and/or the protective layer may have a cross-linked structure for the purpose of acquiring improved handling characteristic, specifically scratch resistance, and improved travelling characteristic at the time of writing with a thermal printer. The cross-linked structure therein has no particular restriction as to its bonding form, but the bonding form may be any of hydrogen bonding, ionic bonding and covalent bonding. In particular, it is desirable for the cross-links to be created by covalent bonding in the foregoing layer(s).

The reaction form for creating covalent bonds is not limited to any particular one among the bond formation reactions generally employed in the field of organic syntheses so long as they have no influence on image-forming reactions according to the invention. As to the conditions well suited to cause cross-linking reaction, e.g., the heating at the time when the coated layer is dried or the irradiation with light of specified wavelengths (e.g., UV light) can be employed for the progress of the cross-linking reaction. In the case of heating, it is desirable to choose a cross-linking reaction proceeding at the lowest possible temperature (preferably at 60° C. or below) because there is a fear of decomposing the present acid-generating compound. In addition, appropriate catalysts may be used for the purpose of accelerating the reaction.

Examples of functional groups suitable for setting the cross-linking reaction off are recited below, but these examples are not to be construed as limiting the scope of the invention in any way.

Examples of a combination of functional groups which can set the cross-linking reaction off by heating or at room temperature include the following:

(1) the combination of a hydroxyl group with an epoxy, isocyanato, N-methylol, carboxyl, haloalkyl, acid anhydride, formyl or acetal group, (2) the combination of an isocyanato group with a hydroxyl, mercapto, carboxyl or N-methylol group, (3) the combination of a carboxyl group with an epoxy, isocyanato or N-methylol group, (4) the combination of an N-methylol group with an isocyanato, N-methylol, carboxyl or hydroxyl group, (5) the combination of an epoxy group with a hydroxyl, mercapto, carboxyl or N-methylol group, (6) the combination of a vinylsulfone group with a sulfinic acid group, (7) the combination of a formyl group with a hydroxyl, mercapto or active methylene group, and (8) the combination of a mercapto group with a formyl, vinyl (including allyl and acryl), epoxy, isocyanato, N-methylol, carboxyl, haloalkyl or acid anhydride group.

In the way of setting the reaction off by irradiation with UV light, it is desirable to utilize the radical polymerization of olefins wherein a small amount of photodecomposable radical generator is used as a catalyst. On the other hand, the use of thermodecomposable radical generator as a catalyst makes it possible to set the foregoing polymerization off by heating alone. Examples of a photodecomposable radical generator usable therein include those commercially produced, e.g., by Ciba-Geigy Ltd., such as Irgacure 907, Irgacure 651 and Kayacure DETX-S. As examples of a thermodecomposable radical generator are known azo type initiators and peroxide type initiators, such as benzoyl peroxide, t-butyl hydroperoxide and potassium persulfate (which may be used as a redox initiator in combination with, e.g., sodium hydrogen sulfite). In the invention, it is desirable to use an initiator capable of decomposing at the lowest possible temperature, e.g., 2,2'-axobis(2,4-dimethylvaleronitrile), 2,2'-azobis(4-methoxy-2,4-dimethylvaleronitrile) or dimethyl 2,2'-azobis(2,-methylpropionate).

The cross-links can be formed effectively by adopting any of the following methods;

(1) the method of adding a cross-linking agent to the present image recording material, (2) the method of introducing functional groups capable of forming cross-links into the binder, (3) the method of introducing functional groups capable of forming cross-links into a polymer participating in the image forming reaction (specifically a polymer functioning as acid generator, a polymer capable of undergoing a change in its absorption, or a polymer having partial structures respectively assuming two functions described above), and (4) the combination of any two of the foregoing methods (1) to (3).

In the invention, it just happens that the binders or the polymers participating in the image forming reaction contain functional groups applicable to the cross-linking reaction. In such a case, those functional groups may be utilized, but the introduction of functional groups for cross-linking may be carried out intentionally. For the introduction can be adopted a method of using monomers having functional groups for cross-linking (belonging to C in formula (V)) as comonomers in the syntheses of copolymers or a method of introducing functional groups for cross-linking by macromolecular reaction.

As to the synthesis method of copolymers comprising monomers having functional groups for cross-linking, the radical polymerization utilizing vinyl monomers has the advantage of being a simple and easy method. Examples of a vinyl monomer having a functional group for cross-linking (a monomer belonging to C of formula. (V)) are recited below, but the invention should not be construed as being limited to these examples:

More specifically, the representatives of such monomers are hydroxyl group-containing vinyl monomers (e.g., hydroxyethyl acrylate, hydroxyethyl methacrylate, allyl alcohol, hydroxypropyl acrylate, hydroxypropyl methacrylate), isocyanato group-cqntaining vinyl monomers (e.g., isocyanatoethyl acrylate, isocyanatoethyl methacrylate), N-methylol group-containing vinyl monomers (e.g., N-methylolacrylamide, N-methylolmethacrylamide), epoxy group-containing vinyl monomers (e.g., glycidyl acrylate, glycidyl methacrylate, allyl glycidyl ether, CYCLOMER-M100, A200 (trade names, products of Daicel Chemical Industries, Ltd.)), carboxyl group-containing vinyl monomers (e.g., acrylic acid, methacrylic acid, itaconic acid), haloalkyl group-containing vinyl monomers (e.g., chloromethylstyrene, 2-hydroxy-3-chloropropyl methacrylate), acid anhydride-containing vinyl monomers (e.g., maleic acid anhydride), formyl group-containing vinyl monomers (e.g., acrolein, methacrolein), sulfinic acid group-containing vinyl monomers (e.g., potassium styrenesulfinate), active methylene-containing vinyl monomers (e.g., acetoacetoxyethyl methacrylate) and vinyl group-containing vinyl monomers (e.g., allyl methacrylate, allyl acrylate). The introduction of these monomers into binders and polymers participating in the image-forming reaction can be carried out using a general radical copolymerization method.

Examples of a polymer represented by formula (V) into which the functional groups enabling cross-linking reaction are introduced by using the monomer as recited above at the time the polymer is synthesized are shown below, but these examples are not to be construed as limiting the scope of the invention in any way.

KB-1: Methyl methacrylate/glycidyl methacrylate (50/50 by weight %)copolymer

KB-2: Methyl methacrylate/N-methylolacrylamide (80/20 by weight %) copolymer

KB-3: t-Butyl methacrylate/butyl acrylate/2-hydroxyethyl methacrylate (60/10/30 by weight %) copolymer KB-4: Styrene/2-hydroxyethyl methacrylate (30/70 by weight %) copolymer KB-5: Styrene/glycidyl methacrylate (40/60 by weight %) copolymer KB-6: Propyl acrylate/acetoacetoxyethyl methacrylate (30/70 by weight %) copolymer KB-7: t-Butyl methacrylate/methacrylic acid (80/20 by weight %) copolymer KB-8: Styrene/allyl methacrylate (50/50 by weight %) copolymer KB-9: Ethyl methacrylate/maleic anhydride (50/50 by weight %) copolymer KB-10: Styrene/N-methylolacrylamide (80/20 by weight %) copolymer KB-11: Ethyl methacrylate/2-hydroxyethyl methacrylate (60/40 by weight %) copolymer KB-12: Styrene/chloromethylstyrene (50/50 by weight %) copolymer KB-13: Methyl methacrylate/acrolein (80/20 by weight %) copolymer KP-1: A-(1)/glycidyl methacrylate (50/50 by weight %) copolymer KP-2: A-(5)/B-(17)/N-methylolacrylamide (45/45/10 by weight %) copolymer KP-3: A-(4)/B-(22)/2-hydroxyethyl methacrylate (20/20/60 by weight %) copolymer KP-4: A-(33)/B-(22)/methacrylic acid (30/30/40 by weight %) copolymer KP-5: A-(1)/B-(22)/glycidiyl methacrylate (40/40/20 by weight %) copolymer KP-6: A-(3)/B-(2) /acetopacetoxyethyl methacrylate (30/30/40 by weight %) copolymer KP-7: A-(28)/B-(18)/methacrylic acid (40/40/20 by weight %) copolymer KP-8: A-(1)/B-(22)/allyl methacrylate (40/40/20 by weight % copolymer KP-9: A-(1)/B-(1)/maleic anhydride (40/20/40 by weight %) copolymer KP-10: A-(14)/B-(14)/N-methylolacrylamide (40/40/20 by weight %) copolymer KP-11: A-(32)/B-(20)/2-hydroxyethyl methacrylate (30/30/40 by weight %) copolymer KP-12: A-(1)/B-(22)/chloromethylstyrene (40/30/30 by weight %) copolymer KP-13: B-(19)/methyl methacrylate/acrolein (40/40/20 by weight %) copolymer KP-14: A-(27)/C-(18) (80/20 by weight %) copolymer The method of utilizing macromolecular reaction for the introduction of functional groups capable of forming cross-links is effective in introducing functional groups of the kind which cause gelling when the polymerization is carried out using the monomers containing them, such as a vinylsulf one group and polymerizing vinyl groups (e.g., acryloyl, methacryloyl). The introduction of any of those functional groups can be effected by synthesizing a copolymer using a hydrogen chloride-added vinyl group-containing monomer as a comonomer and then subjecting the copolymer to dehydrochlorination. As to the introduction of acryloyl or methacryloyl groups, the synthesis of the intended polymer may be carried out by the reaction between the polymer having hydroxyl groups and the corresponding acid chloride.

The cross-linking agent which can be added to the present image recording material has no particular limitations, except a limitation that it has no adverse influence on the image forming reaction, but it can be selected properly from hitherto known ones. Examples of a cross-linking agent usable herein include epoxy compounds, such as Celloxide 2021 and 2080 (trade names, products of Daicel Chemical Industries, Ltd.), Rikaresin BEO-60E (trade name, a product of New Japan Chemical Co., Ltd.) and 1,3-diglycidyloxypropane; isocyanate compounds, such as xylylene diisocyanate, toluene diisocyanate, hexamethylene diisocyanate, Duranate WB40-80D and WX-1741 (trade names, products of Asahi Chemical Industry Co., Ltd.), Baijule 3100 (trade name, a product of Sumitomo Bayer Urethane Co., Ltd.), Takenate WD725, D110N, D114N (trade names, products of Takeda Chemical Industries Ltd.) andAquanate 100 and 200 (trade names, products of Nippon Polyurethane Industries Co., Ltd.); methylol compounds, such as 1,3-dimethylolethyleneurea, 1,3-dimethylolpropyleneurea and 4-methoxy-5,5-dimethyl-N,N'-dimethylolpropyleneurea; carboxyl compounds, such as succinic acid, pyromellitic acid, benzophenone tetracarboxylic acid and polyacrylic acid; hydroxyl compounds, such as propanediol, glycerol, polyvinyl alcohol and carboxymethyl cellulose; sulfinic acid compounds, such as benzenesulfinic acid and 3,4-disulfinotoluene; acrylate compounds, such as NK Ester APG-400, A-TMPT and A-TMMT (trade names, products of Shin-Nakamura Chemical Co. Ltd.); acid anhydrides, such as pyromellitic anhydride and 4,4,'-oxydiphthalic dianhydride; and mercapto compounds, such as dithioerythritol, dithiocyanuric acid, 1,3-benzenedithiol and thiobisbenzenethiol.

It is desirable to use a cross-linking agent in a proportion of 1 to 150 weight %, preferably 5 to 100 weight %, to the binder or the polymer.

When bases are added for the purpose of heightening the keeping quality of the image forming material, it is desirable for them to be organic bases. Examples of an organic bases suitable for such a purpose include guanidine derivatives (such as 1,3-diphenylguanidine, 1,3-dimethylguanidine, 1,3-dibutylguanidine, 1-benzylguanidine and 1,1,3,3-tetramethylguanidine), aniline derivatives (such as aniline, p-t-butylaniline, N,N'-dimethylaniline, N,N'-dibutylaniline and triphenylamine), alkylamine derivatives (such as tributylamine, octylamine, laurylamine, benzylamine and dibenzylamine) and heterocyclic compounds (such as N,N'-dimethylaminopyridine, 1,8-diazabicyclo[5.4.0]-7-undecene, triphenylimidazole, lutidine and 2-picoline).

It is desirable that these bases be added in a proportion of 1 to 50 mole %, especially preferably 5 to 20 mole %, to the composition represented by A in formula (V).

For the purpose of increasing the sensitivity of the image forming material, thermoacid generators may be added specially. In a case where two or more acid generators are used as a combination, they may be acid generators included in the compounds represented by the present formula (I) to (IV) . Also, the combination may be a combination of compound(s) selected from those represented by the present formulae (I) to (IV) with known acid generator(s). As examples of known acid generators, mention may be made of the compounds recited in a book entitled "Organic Materials for Imaging", pages 37–91, which was compiled by The Society for study of Organic Electronics Materials and published by Bunshin Shuppan in 1997, and the compounds described in the references cited in the foregoing book. Additionally, many of the compounds recited therein as photoacid generators function as thermoacid generators, too.

Examples of a pigment which can be added include diatomaceous earth, talc, kaolin, calcined kaolin, titanium oxide, silicon oxide, magnesium carbonate, calcium carbonate, aluminum hydroxide and urea-formaldehyde resin.

As to other additives, ultraviolet absorbents of benzophenone type or benzotriazole type, head abrasion and sticking inhibitors constituted of metal salts of higher fatty acids, such as zinc stearate and calcium stearate, and waxes, such as oxidized paraffin, polyethylene, oxidized polyethylene and castor wax, can be added, if needed.

As examples of a support which can be used in the present image recording materials, mention may be made of various kinds of paper, including woodfree paper, baryta paper, coated paper, cast-coated paper and synthetic paper, polymer films such as polyethylene, polypropylene, polyethylene terephthalate, polyethylene-2,6-naphthylenedicarboxylate, polyarylene, polyimide, polycarbonate and triacetyl cellulose films, glass, metallic foil and nonwoven fabric.

In designing the present image recording materials so as to form transmission type images with the intention of utilizing them as OHP films or graphic arts films, transparent supports are employed. When the present image recording materials are utilized as graphic arts films, their supports are further required to have small thermal expansion coefficient, good dimensional stability and no absorption in the sensitive region of a presensitized plate.

The original images can be reproduced in the present recording materials as mentioned above by moving the recording materials under a thermal printer head and heating them according to the original images. The heating with-the thermal printer head may be performed on either side of the recording material, namely the protective layer side or the backing layer side. However, the heating on the protective layer side is preferable. The recording materials can be heated at around 400° C. at the highest by changing the number of thermal pulses emitted by the thermal printer head. And the change in number of thermal pulses changes the number of pixels corresponding thereto.

Examples of a thermal printer and a thermal printer head usable in the present invention include FTI-1000 made by Fuji Photo Film Co., Ltd., a Fujitsu Thermal Head FTP-040 MSC001, a TDK Thermal Head F415 HH7-1089 and a Rohm Thermal Head KE2008-F3.

In the recording method using a thermal printer head, the protective layer at the surface bears an important part with respect to the prevention of head smear and the prevention of scratches on the recording material. Therefore, it is desirable that the present recording materials have protective layers. Although various kinds of protective layers are known, those preferably used in the present recording materials are the protective layers disclosed in JP-A-8-58239, JP-A-8-90917, JP-A-8-90916 and JP-A-276664, which each contain binder and pigment or wax (the details of these constituents are described in those specifications), and the protective layers constituted of radiation curable compositions as disclosed in JP-A-8-505579.

The representative synthesis examples of the present compounds are illustrated below.

Synthesis Example 1

Synthesis of S-(20)

1,4-Butanediol (1-1) in an amount of 5 g was dissolved in 50 ml of THF, and thereto 6.23 g of potassium t-butoxide was added. To this solution, 12.1 g of di-t-butyldicarbonate (1-2) was further added at room temperature, and stirred for 2 hours. The resulting solution was added to 100 ml Qf water, and thereto 200 ml of ethyl acetate was added to extract an organic layer. The organic layer was washed with water for two times, dried with magnesium sulfate, and concentrated. The concentrate obtained was purified by column chromatography on silica gel, to yield 3 g of Compound (1-3) as an oily substance.

The $^1$H-NMR ($CDCl_3$) analysis of the compound obtained was as follows: δ (ppm); 1.49 (s, 9H), 1.70 (m, 4H), 1.96 (br, 1H), 3.66 (t, 2H), 4.10 (t, 2H).

The compound (1-3) in an amount of 2 g was dissolved in 10 ml of methylene chloride, and thereto 1.57 ml of triethylamine, 0.28 g of 4-dimethylaminopyridine and 2.16 g of toluenesulfonyl chloride were added and stirred for 2 hours at room temperature. The resulting reaction solution was poured into 10 ml of water, and therefrom an organic layer was extracted. The organic layer was washed with water for two times, dried with magnesium sulfate, and then concentrated. The concentrate obtained was purified by column chromatography on silica gel to yield 1.5 g of Exemplified Compound S-(20) as a colorless transparent oily substance.

The $^1$H-NM ($CDCl_3$) analysis of the thus obtained substance was as follows: δ (ppm); 1.48 (s, 9H), 1.71 (m, 4H), 2.48 (s, 3H), 4.00 (t, 2H), 4.05 (t, 2H), 7.34 (d, 2H), 7.80 (d, 2H).

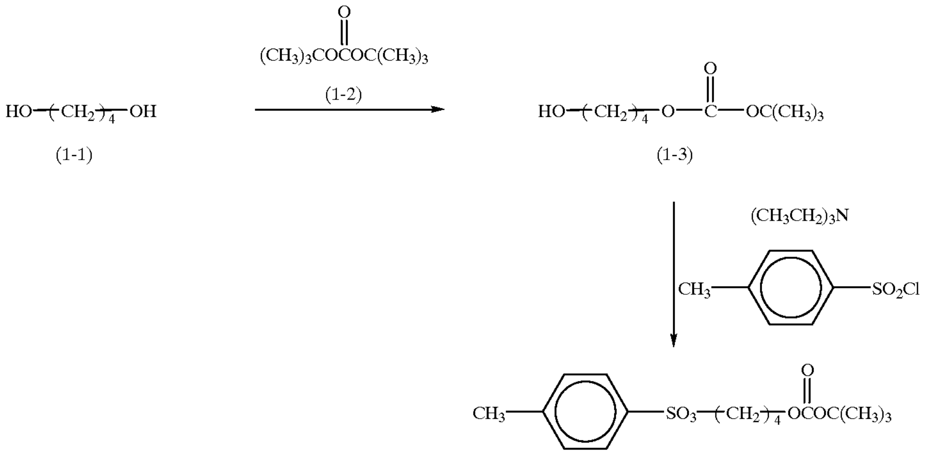

(1-1) (1-3)

Exemplified Compound S-(20)

Synthesis Example 2

Synthesis of A-(28)

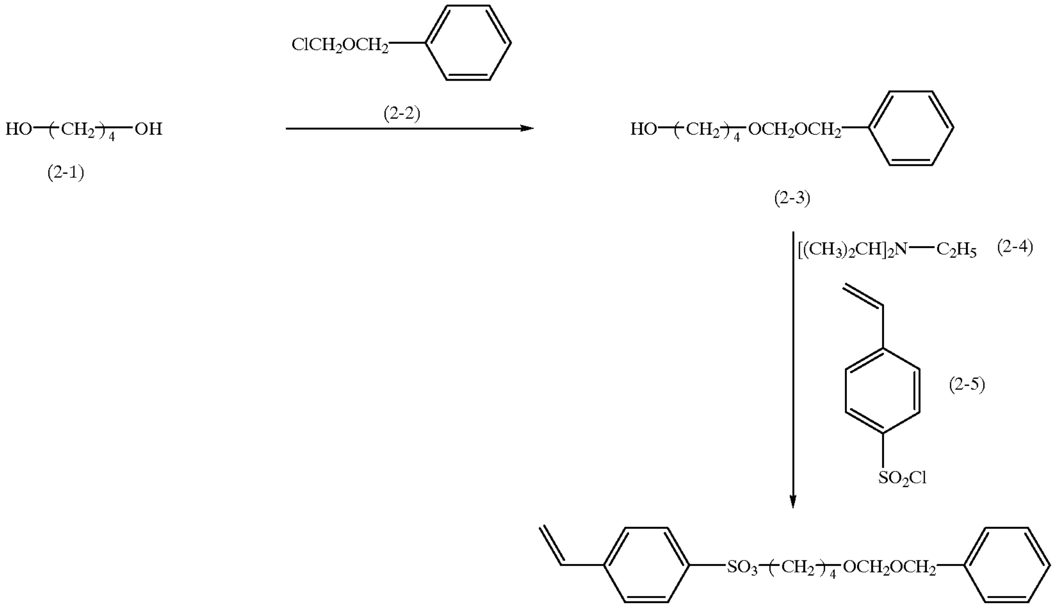

(2-1)

(2-2)

(2-3)

(2-4)

(2-5)

Exemplified Compound A-(28)

Compound (2-1) in an amount of 9.01 g was put in 50 ml of tetrahydrofuran, and thereto 4 g of an oil dispersion of sodium hydride (content: 60%) was added. After stirring the mixture for one hour, Compound (2-2) in an amount of 15.66 g was added thereto. The stirring was continued for additional 3 hours. Then, 70 ml of ethyl acetate and 50 ml of water were added thereto, and the water layer was separated. Further, the reaction solution was washed with water, and the organic layer was dried with anhydrous sodium sulfate and then concentrated. The oily substance obtained was purified by column chromatography on silica gel (eluent; 1:4 by volume mixture of ethyl acetate and hexane) to yield 9.5 of Compound (2-3).

Then, 6.3 g of Compound (2-3) was dissolved in 50 ml of methylene chloride, and thereto 5.17 g of Compound (2-4) and 6.08 g of Compound (2-5) were added. After the resulting admixture was stirred for 5 hours, hexane was added thereto. The resulting solution was directly subjected to purification by column chromatography on silica gel (eluent; 1:5 by volume mixture of ethyl acetate and hexane). Thus, 6.2 g of Exemplified Compound A-(28) was obtained in a yield of 55%.

The $^1H$-NMR ($CDCl_3$) analysis of the compound obtained was as follows: δ (ppm); 1.65 (4H), 3.55 (2H), 4.1 (2H), 4.6 (2H), 4.75 (2H), 5.5 (1H), 5.9 (1H), 6.8 (1H), 7.35 (5H), 7.6 (2H), 7.9 (2H).

Synthesis Example 3

Synthesis of S-(22)

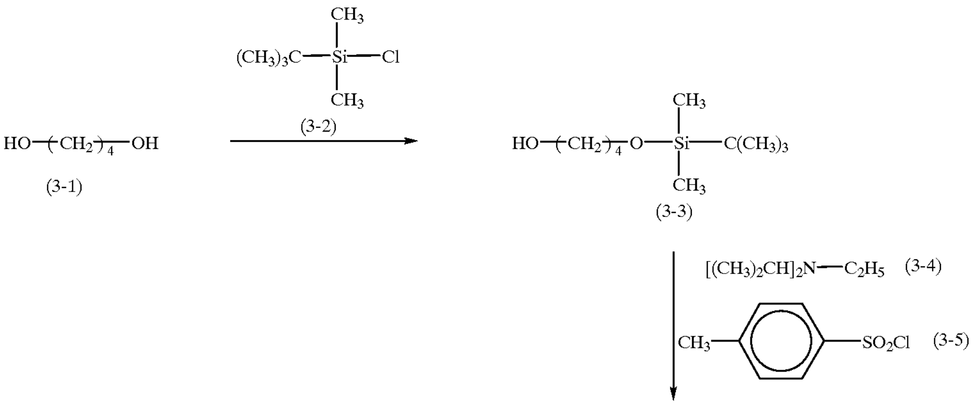

(3-1)

(3-2)

(3-3)

(3-4)

(3-5)

-continued

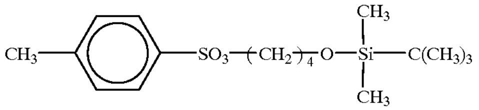

Exemplified Compound S-(22)

Compound (3-1) in an amount of 15.07 g was put in 70 ml of tetrahydrofuran, and thereto 4 g of an oil dispersion of sodium hydride (content: 60%) was added. After stirring the admixture for one hour, Compound (3-2) in an amount of 15.66 g was added thereto. The stirring was continued for additional 3 hours. Then, 70 ml of ethyl acetate and 50 ml of water were added thereto, and the water layer was separated. Further, the reaction solution was washed with water, and the organic layer was dried with anhydrous sodium sulfate and then concentrated. The oily substance obtained was purified by column chromatography on silica gel (eluent; 1:5 by volume mixture of ethyl acetate and hexane) to yield 8.4 g of Compound (3-3).

Then, 2.04 g of Compound (3-3) was dissolved in methylene chloride, and thereto 2.6 g of Compound (3-4) and 1.91 g of Compound (3-5) were added. After the resulting admixture was stirred for 5 hours, hexane was added thereto. The resulting solution was directly subjected to purification by column chromatography on silica gel (eluent; 1:10 by volume mixture of ethyl acetate and hexane). Thus, 2.3 g of Exemplified Compound S-(22) was obtained in a yield of 63%.

The $^1$H-NMR ($CDCl_3$) analysis of the compound obtained was as follows: δ (ppm); −0.1 (6H), 0.95 (9H), 1.6 (4H), 2.5 (3H), 3.6 (2H), 4.1 (2H), 7.4 (2H), 7.8 (2H).

Synthesis Example 4

Synthesis of LD-(16)

Acetic anhydride in an amount of 4.16 g was added to 4.5 g of quinoline-N-oxide monohydrate, and stirred for one hour at room temperature to prepare a homogeneous solution. To this solution was added 5 g of 3-phenylisooxazolone suspended in 10 ml of chloroform, followed by stirring for 3 hours at room temperature. The reaction solution was washed with water, dried with magnesium sulfate, and then concentrated. The oily substance obtained was purified by column chromatography on silica gel (developing solvent; 1:1 mixture of n-hexane and ethyl acetate), and then methanol was added to the purified substance to give 1.75 g of a lemon yellow dye (m.p. 223–224° C., λmax=423 nm (ε=16200) in ethyl acetate).

Next, 1 g of the dye obtained was dissolved in 10 ml of THF, and thereto 139 mg of an oil dispersion of sodium hydride (content: 60%) was added. Thereto, 6.2 g of di-t-butyl-dicarbonate was further added, and heated under reflux for 30 minutes. The reaction solution was mixed with ethyl acetate, washed with water, and therefrom an organic layer was extracted. The organic layer was dried with magnesium sulfate, and then concentrated. The oily substance thus obtained was purified by column chromatography on silica gel (developing solvent; 1:1 mixture of n-hexane and ethyl acetate) to yield 450 mg of LD-(16) as colorless crystals (m.p. 137–138° C., λmax=335 nm (ε=14800) in ethyl acetate). The structure of these crystals was identified by NMR analysis and mass spectrometry.

Synthetic Example 5

Synthesis of LD-(20)

The dye in an amount of 0.3 g, which was obtained as a synthesis intermediate in Synthetic Example 4, was dissolved in 3 ml of THP, and added to 41.6 mg of an oil dispersion of sodiumhydride (content: 60%). Thereto, 0.2ml of chloromethyl octyl ether was further added, and stirred for 3 hours at room temperature. The reaction solution was mixed with ethyl acetate, washed with water, and therefrom an organic layer was extracted. The organic layer was dried with magnesium sulfate, and then concentrated. The oily substance thus obtained was purified by column chromatography on silica gel (developing solvent; 3:1 mixture of n-hexane and ethyl acetate) to yield 250 mg of LD-(20) as colorless oil (λmax=340 nm (ε=12800) in ethyl acetate). The structure of this oil was identified by NMR analysis and mass spectrometry.

Synthesis Example 6

Synthesis of P-(3)

1) Synthesis of A-(1)

In 90 ml of methylene chloride, 18 g of 2-methyl-2-(2-hydroxymethyl)acetoacetatic acid t-butyl ester prepared according to the method described in JP-A-8-248561, 19.8 g of triethylamine and 2 g of 4-dimethylaminopyridine were dissolved. To this solution, 18 g of paravinylbenzenesulfonyl chloride (prepared by reacting sodium paravinylbenzenesulfonate with thionyl chloride) was further added, and stirred for 4 hours at room temperature. From the reaction solution thus obtained was extracted an organic layer by the addition of 100 ml of water. The organic layer was washed with 100 ml each of water for two times and dried with magnesium sulfate. Thereafter, it was admixed with 2 mg of hydroquinone monomethyl ether, and concentrated under reduced pressure. The oily substance obtained was purified by column chromatography on silica gel (developing solvent; 3:1 mixture of n-hexane and ethyl acetate) to give 17.7 g of colorless transparent oil A-(1) in a 54.1% yield. The structure of the oil thus obtained was identified by mass spectrometry, elemental analysis and $^1$H-NMR analysis.

Mass spectrometry: $M^+$=367

Elemental analysis Calcd.: C, 58.68 %; H, 6.57 %; S, 8.70% Found: C, 58.69 %; H, 6.59 %; S, 8.71%

$^1$H-NMR ($CDCl_3$): δ (ppm); 1.40 (s, 3H), 1.42 (s, 9H), 2.15 (s, 3H), 4.30 (ABq, 2H), 5.50 (d, 1H), 5.93 (d,1H), 6.78 (dd, 1H), 7.58 (d, 2H), 7.85 (d, 2H).

2) Synthesis of B-(22)

In 300 ml of THF, 50 g of 4-(2-methacryloyloxyethyl)-2-(2H-benzotriazole-2-yl)phenol (produced by Otsuka Chemical Co., Ltd.) and 5 ml of nitrobenzene were dissolved. Thereto, 7.4 g of an oil dispersion of sodium hydride (content: 60%) was added under cooling in a water bath. To this solution, 104 g of chloromethyl octyl ether was further added, and stirred for 3 hours at room temperature. To the reaction solution thus obtained was added 500 ml of ethyl acetate, and the organic layer was washed with water, followed by drying with magnesium sulfate. Thereafter, the resulting organic layer was concentrated under reduced pressure, purified by column chromatography on silica gel (developing solvent; 9:1 mixture of n-hexane and ethyl acetate), and then crystallized from hexane to give 37.8 g of B-(22) as white crystals (yield: 53%). The structure of the crystals thus obtained was identified by mass spectrometry, elemental analysis and $^1$H-NMR analysis.

3) Synthesis of P-(3)

In 40 ml of toluene, 22.2 g of A-(1) and 13.8 g of B-(22) were dissolved, and thereto 225 mg of 2,2'-azobisisobutyronitrile in 6 ml toluene solution was added, followed by stirring for 3 hours at 75° C., and further thereto 225 mg of 2,2 '-azobisisobutyronitrile in 6 ml toluene solution was added, followed by stirring for 3 hours at 75° C. The reaction solution obtained was cooled to room temperature, and added to 500 ml of methanol to yield a white polymer. By isolating the white polymer, 34.1 g of a polymer (P-(3)) having a molecular weight of 75000 was obtained in a 95% yield. The polymer obtained was identified to be a copolymer of A-(1) and B-(1) by $^1$H-NMR analysis. Further, x:y was ascertained to be 67:33 by elemental analysis.

Synthesis Example 7

Synthesis of P-(16)

In 5 ml of benzene, 2 g of A-(1) and 1.52 g of B-(14) were dissolved, and thereto 20.2 mg of 2,2'-azobis(2,4-dimethylvaleronitrile) was added, followed by stirring for 10 hours at 60° C. The reaction solution obtained was added to 30 ml of methanol to yield a white amorphous matter. The supernatant liquid was removed by decantation. The residue was dissolved in a small amount of methylene chloride, and reprecipitated with methanol. By removal of the supernatant liquid and drying treatment, 220 mg of a polymer (P-(16)) having a molecular weight of 3800 and a molecular weight distribution Mw/Mn of 3.2 was obtained in a 6.25% yield. The polymer obtained was identified to be a copolymer of A-(1) and B-(14) by $^1$H-NMR analysis. Further, x:y was ascertained to be 67:33 by elemental analysis. Themelting temperatureand the thermal decomposition temperature of the copolymer obtained were 120–123° C. and 145–148° C. respectively, and it was confirmed that the copolymer developed a darkish green color simultaneously with the decomposition.

Synthesis Example 8

Synthesis of P-(11)

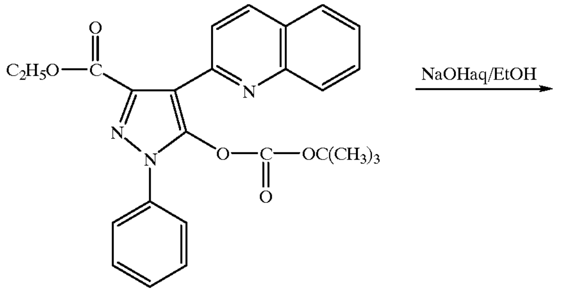

(8-1)

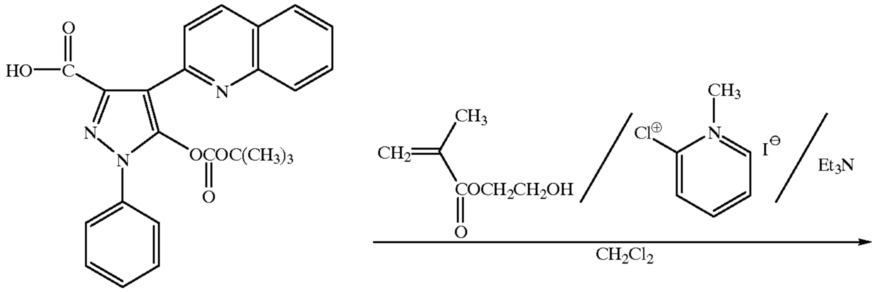

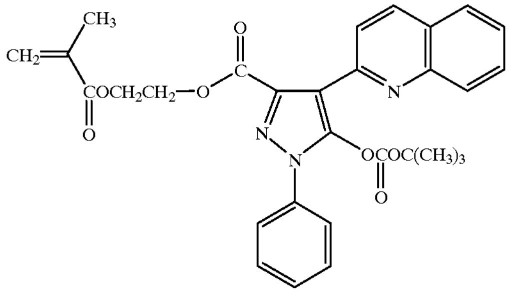

(8-2)

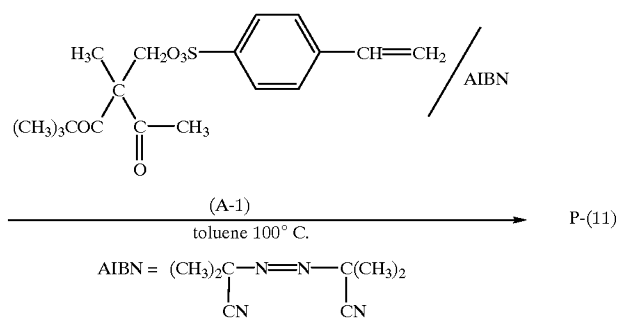

The compound (8-1) prepared in accordance with the method adopted in Synthesis Example 4 was hydrolyzed under cooling in an ice bath, and then condensed with 2-hydroxyethylmethacrylate by the use of 2-chloro-1-methylpyridinium iodide as a condensing agent to yield a leuco dye monomer (8-2).

An acid generator monomer A-(1) and (8-2) were copolymerized by the use of AIBN as an initiator to give P-(11) (molecular weight: 53,000; beginning temperature of pyrolysis: 140.7° C.).

Now, the invention is illustrated in more detail by reference to the following examples, but it should be understood that these examples are not to be construed as limiting the scope of the invention in any way.

EXAMPLE 1

The compounds set forth below were dissolved in chloroform, coated on a 100 μm-thick polyethylene terephthalate film so as to have their respective coverage rates described below, and then dried at 60° C. for 2 hours to make each of transparent heat-sensitive recording sheet samples.

| | |
|---|---|
| Sample 1-1 | |
| P-(3) | Benzotriazole part: 3 mmol/$m^2$ |
| Sample 1-2 | |
| P-(22) | Benzotriazole part: 3 mmol/$m^2$ |
| Sample 1-3 | |
| P-(23) | Dye precursor part: 3 mmol/$m^2$ |
| Sample 1-4 | |
| LD-(20) | 3 mmol/$m^2$ |
| S-(42) | 3 mmol/$m^2$ |
| Polystyrene | 2.4 g/$m^2$ |
| Sample 1-5 | |
| LD-(7) | 3 mmol/$m^2$ |
| S-(22) | 3 mmol/$m^2$ |
| Polystyrene | 2.4 g/$m^2$ |
| Sample 1-6 | |
| LD-(7) | 3 mmol/$m^2$ |
| S-(40) | 3 mmol/$m^2$ |
| Sample 1-7 | |
| LD-(7) | 3 mmol/$m^2$ |
| S-(1) | 3 mmol/$m^2$ |
| Polystyrene | 0.5 g/$m^2$ |
| KB-8 | 0.5 g/$m^2$ |
| V-70 (An Initiator made by Wako Pure Chemical Industries, Ltd.) | 10 mg/$m^2$ |
| Sample 1-8 | |
| KP-9 | Benzotriazole part: 3 mmol/$m^2$ |
| Glycerol | 0.2 g/$m^2$ |
| Sample 1-9 | |
| KP-4 | Benzotriazole part: 1.5 mmol/$m^2$ |
| KP-5 | Benzotriazole part: 1.5 mmol/$m^2$ |
| Sample 1-10 | |
| LD-(7) | 3 mmol/$m^2$ |
| KP-14 | Acid generating part: 3 mmol/$m^2$ |
| Takenate D110N (made by Takeda Chemical Industries, Ltd.) | 0.5 g/$m^2$ |

After drying each of the thus coated samples, polyvinylbutyral (Denka Butyral 3000K, produced by Denki Kagaku Kogyo Mabushiki Kaisha) dissolved in an isopropanol/methyl ethyl ketone mixture (70/30 by volume) was coated thereon at a coverage of 1.5 g/$m^2$ to provide a surface protecting layer.

TABLE 2

| | Developed color density | |
|---|---|---|
| Sample 1-1 | 3.55 | (3.52) |
| Sample 1-2 | 3.72 | (3.75) |
| Sample 1-3 | 3.21 | (3.11) |
| Sample 1-4 | 3.05 | (3.03) |
| Sample 1-5 | 3.28 | (3.30) |
| Sample 1-6 | 3.45 | (3.42) |
| Sample 1-7 | 3.25 | (3.30) |
| Sample 1-8 | 3.41 | (3.42) |
| Sample 1-9 | 3.55 | (3.51) |
| Sample 1-10 | 3.45 | (3.43) |

Each value in parentheses is the density of color each sample developed upon heating with a heat block after it was allowed to stand in daylight for one month.

More specifically, each of Samples 1-1 to 1-10 was heated on a 170° C. heat block, and examined for density at the λmax in the range of 340–450 nm. As shown in Table 2, every sample showed excellent color developability. Further, the foregoing recording sheet samples were allowed to stand in daylight for one month, and the densities of colors they developed with the heat block were evaluated under the same condition as mentioned above. Therein, no appreciable drop in the developed color density was observed. Thus, it was confirmed that the storage of the present heat-sensitive recording sheets in daylight produced no problem.

EXAMPLE 2

The following compound was dissolved in chloroform, coated on a 100 μm-thick polyethylene terephthalate film, and dried to prepare a transparent heat-sensitive recording sheet:

Sample 2-1

P-(23) Dye precursor part: 2 mmol/$m^2$

On this sheet, each of the surface protecting layers described below was provided:

Surface protecting layer (1): Polyvinylbutyral (Denka Butyral 3000K, produced by Denki Kagaku Kogyo Kabushiki Kaisha) dissolved in an isopropanol/methyl ethyl ketone mixture (70/30 by volume) was coated at a coverage of 1.5 g/$m^2$, and then dried.

Surface protecting layer (2): The protective layer solution as described in Example 1 of JP-A-8-90917 was coated at a coverage of 2.0 g/$m^2$, and then dried.

Surface protecting layer (3): The protective layer solution as described in Example 1 of JP-A-8-90916 was coated at a coverage of 2.0 g/$m^2$, and then dried.

On each of the thus obtained samples, the image whose black percentage was changed stepwise in an increment of 10% from 0% to 100% in the main scanning direction was recorded by means of a thermal printer FTI-1000 (trade name, a product of Fuji Photo Film Co., Ltd.).

As a result, it was found that the sample provided with the surface protecting layer (1) emitted a large sticking sound and had some skippedareas upon writing with the thermal printer, while the samples provided with the surface protecting layers (2) and (3) caused almost no sticking sound and had no skipped area.

EXAMPLE 3

The following compound was dissolved in chloroform, coated on a 100 μm-thick polyethylene terephthalate film, and dried to prepare a transparent heat-sensitive recording sheet:

Sample 3-1

P-(3) Benzotriazole part: 2 mmol/$m^2$

On this sheet, each of the surface protecting layers described below was provided:

Surface protecting layer (1): Polyvinylbutyral (Denka Butyral 3000K, produced by Denki Kagaku Kogyo Kabushiki Kaisha) dissolved in an isopropanol/methyl ethyl ketone mixture (70/30 by volume) was coated at a coverage of 1.5 g/$m^2$, and then dried.

Surface protecting layer (2): The anatase-type titanium dioxide and gelatin as described in Present Example 1 of JP-A-8-58239 were coated so as to have their coverage rates described therein, and then dried.

Surface protecting layer (3): The burned china clay as described in Example 1 of JP-A-8-276664 was coated at the coverage described therein by means of a doctor blade, and then dried.

Surface protecting layer (4) The covering layer as described in Example 1 of JP-A-8-505579 was coated and cured with radiation.

On each of the thus obtained samples, the image whose black percentage was changed stepwise in an increment of 10% from 0% to 100% in the main scanning direction was recorded by means of a thermal printer FTI-1000 (trade name, a product of Fuji Photo Film Co., Ltd.).

As a result, it was found that the sample provided with the surface protecting layer (1) caused a considerable smear on the thermal printer head upon writing; while the samples provided with the surface protecting layers (2) to (4) gave rise to almost no smear on the thermal printer head. In other words, the latter three samples showed a great improvement.

In accordance with embodiments of the invention, high thermal sensitivity and high developed color density can be imparted to recording materials, the handling and storage of recording materials in daylight become possible, and reduction in smear on a thermal printer head and sticking trouble can be achieved.

What is claimed is:

1. An image forming method comprising forming images in an image-forming material by means of a thermal printer head, wherein the image-forming material has on a support an image-forming layer and a protective layer comprised of a binder and a pigment or wax, and the image forming material comprises a compound capable of releasing a strong acid under the action of heat and a compound capable of forming a dye by a reaction with an acid, wherein the compound capable of releasing a strong acid is a compound represented by the following formula (II), (III) or (IV):

(II)

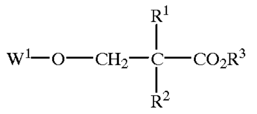

wherein $R^1$ represents an electron-attracting group having a Hammett's $\sigma_P$ value greater than 0, $R^2$ represents an alkyl group, $R^3$ represents a group eliminable by the action of heat or an acid, and $W^1$ represents a moiety to constitute the acid of formula $W^1OH$;

(III)

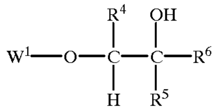

wherein $R^4$, $R^5$ and $R^6$ each represent a hydrogen atom, an alkyl group or an aryl group, and $W^1$ represents a moiety to constitute the acid of formula $W^1OH$; and $$P^2—X—L—C(R^7)(R^8)—OW^1 \quad (IV)$$

wherein $p^2$ represents a substituent group eliminable by the action of heat or an acid, X represents O, S, $NR^9$ or $CR^{10}R^{11}$ wherein $R^9$ is a hydrogen atom or a group substitutable for hydrogen atom and $R^{10}$ and $R^{11}$, which may be the same or different, each represents a hydrogen atom or a group substitutable for hydrogen atom, L represents a linkage group, $R^7$ and $R^8$, which may be the same or different, each represents a hydrogen atom or a group substitutable for hydrogen atom, and $W^1$ represents a moiety to constitute the acid of formula $W^1OH$.

2. The image forming method as claimed in claim 1, wherein the compound capable of forming a dye by the reaction with an acid is a compound capable of undergoing a change in the absorption region of 360 to 900 nm when an acid acts thereon.

3. The image forming method as claimed in claim 1, wherein the compound capable of releasing a strong acid under the action of heat and/or the compound capable of forming a dye by the reaction with an acid is a polymer comprising both a partial structure capable of functioning as an acid generator under heating or in the presence of an acid and a partial structure capable of undergoing a change in the absorption region of 360 and 900 nm when an acid acts thereon.

4. The image forming method as claimed in claim 3, wherein the polymer is a polymer represented by the following formula (V):

$$-(A)_x-(B)_y-(C)_z- \quad (V)$$

wherein A represents a constitutional unit repeated in the polymerization of at least one vinyl monomer functioning as an acid generator by the action of heat or an acid; B represents a constitutional unit repeated in the polymerization of at least one vinyl monomer having a partial structure undergoing a change in the absorption region of 360–900 nm when an acid acts thereon; C represents a constitutional unit repeated in the polymerization of at least one vinyl monomer capable of copolymerizing with the vinyl monomers from which A and B are derived; and x, y and z represent proportions of constitutional units A, B and C respectively, and these proportions are expressed in weight % and have the following relations, $1 \leqq x \leqq 100$, $0 \leqq y \leqq 99$, $0 \leqq z \leqq 99$ and $x+y+z=100$.

5. The image forming method as claimed in claim 1, wherein the protective layer is formed of a radiation-curable composition.

6. An image-forming material used in a method of forming images as described in any one of claims 1, 2, 3, 4 or 5.

* * * * *